(12) United States Patent
Haddad

(10) Patent No.: US 9,591,192 B2
(45) Date of Patent: *Mar. 7, 2017

(54) MICROPHONE AND CAMERA DISRUPTION APPARATUS AND METHOD

(71) Applicant: Vysk Communications, Inc., San Antonio, TX (US)

(72) Inventor: Waleed Sami Haddad, San Francisco, CA (US)

(73) Assignee: VYSK COMMUNICATIONS, INC., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,602

(22) Filed: Aug. 31, 2015

(65) Prior Publication Data

US 2016/0065817 A1 Mar. 3, 2016

Related U.S. Application Data

(63) Continuation of application No. 14/276,288, filed on May 13, 2014, now Pat. No. 9,124,792, which is a
(Continued)

(51) Int. Cl.
*H04N 5/225* (2006.01)
*G03B 11/04* (2006.01)
(Continued)

(52) U.S. Cl.
CPC ......... *H04N 5/2254* (2013.01); *G03B 11/045* (2013.01); *G03B 17/565* (2013.01);
(Continued)

(58) Field of Classification Search
CPC .... H04N 5/2254; H04N 5/225; H04N 5/2252; H04N 5/2257; H04N 5/232;
(Continued)

(56) References Cited

U.S. PATENT DOCUMENTS 5,949,892 A 9/1999 Stewart
7,581,893 B2 9/2009 Miramontes
(Continued)

FOREIGN PATENT DOCUMENTS

JP 2007065443 3/2007
KR 1020060031900 4/2006
(Continued)

OTHER PUBLICATIONS

U.S. File History for U.S. Appl. No. 14/102,382 as retrieved from the U.S. Patent and Trademark Office on Aug. 31, 2015, 96 pages.
(Continued)

*Primary Examiner* — Twyler Haskins
*Assistant Examiner* — Angel L Garces-Rivera
(74) *Attorney, Agent, or Firm* — Workman Nydegger

(57) ABSTRACT

An apparatus for use with an electronic device having a microphone and a camera. The apparatus comprises a structure configured to detachably couple to the device, and a shutter supported by the structure and comprising a lens shutter configured to obscure a lens of the camera when in an engaged position. A generator is supported by the structure and configured to generate a force that acts on the microphone and renders the microphone unresponsive to voice sounds.

21 Claims, 15 Drawing Sheets

Related U.S. Application Data continuation of application No. 14/102,387, filed on Dec. 10, 2013, now Pat. No. 8,724,020.

(51) Int. Cl.
  *G03B 17/56* (2006.01)
  *G03B 31/00* (2006.01)
  *G10K 11/00* (2006.01)

(52) U.S. Cl.
  CPC ............ *G03B 31/00* (2013.01); *G10K 11/002* (2013.01); *H04N 5/2257* (2013.01)

(58) Field of Classification Search
  CPC H04N 1/00307; H04N 5/64; H01L 27/14618; G03B 31/00; G03B 11/045; G03B 17/565; G10K 11/002
  See application file for complete search history.

(56) References Cited

U.S. PATENT DOCUMENTS

| | | | |
|---|---|---|---|
| 7,728,906 | B2 | 6/2010 | Bilbrey |
| 8,004,603 | B2 | 8/2011 | Nozaki |
| 8,253,852 | B2 | 8/2012 | Bilbrey |
| 8,432,485 | B1 | 4/2013 | Martinez et al. |
| 8,471,956 | B2 | 6/2013 | Fortmann |
| 8,496,390 | B2 | 7/2013 | Ohuchi et al. |
| 8,724,020 | B1 * | 5/2014 | Haddad ............... H04N 5/225 348/375 |
| 8,731,186 | B1 | 5/2014 | Haddad |
| 2005/0052567 | A1 | 3/2005 | Huang et al. |
| 2005/0068423 | A1 | 3/2005 | Bear et al. |
| 2005/0225668 | A1 | 10/2005 | Kim |
| 2008/0187306 | A1 | 8/2008 | Sugiura |
| 2011/0058255 | A1 | 3/2011 | Weiss |
| 2011/0063864 | A1 | 3/2011 | Brown et al. |
| 2011/0065392 | A1 | 3/2011 | Chung et al. |
| 2012/0183156 | A1 | 7/2012 | Schlessinger et al. |
| 2012/0229380 | A1 | 9/2012 | Silvester |
| 2012/0301132 | A1 | 11/2012 | Mitskog et al. |
| 2013/0050549 | A1 | 2/2013 | Bilbrey |
| 2013/0162124 | A1 | 6/2013 | Miyaoka et al. |
| 2013/0222609 | A1 | 8/2013 | Soffer |
| 2015/0163383 | A1 | 6/2015 | Barangan et al. |
| 2015/0163385 | A1 | 6/2015 | Haddad |
| 2015/0163589 | A1 | 6/2015 | Haddad |

FOREIGN PATENT DOCUMENTS

| | | |
|---|---|---|
| KR | 100598053 | 7/2006 |
| KR | 101149925 | 5/2012 |

OTHER PUBLICATIONS

U.S. File History for U.S. Appl. No. 14/102,387 as retrieved from the U.S. Patent and Trademark Office on Aug. 31, 2015, 128 pages.
U.S. File History for U.S. Appl. No. 14/276,288 as retrieved from the U.S. Patent and Trademark Office on Aug. 31, 2015, 178 pages.
International Search Report and Written Opinion dated Mar. 12, 2015 for PCT Application No. PCT/US2014/069568, 11 pages.
International Search Report and Written Opinion dated Mar. 31, 2015 for PCT Application No. PCT/US2014/069571, 12 pages.
Jun. 14, 2016 U.S. File History for U.S. Appl. No. 14/566,378 as retrieved from the U.S. Patent and Trademark Office on Jun. 14, 2016, 114 pages.

* cited by examiner

Figure 16
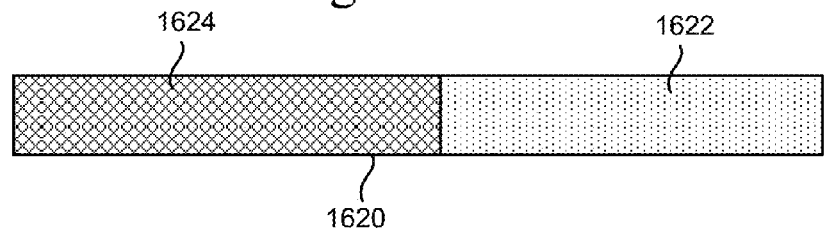
Figure 17
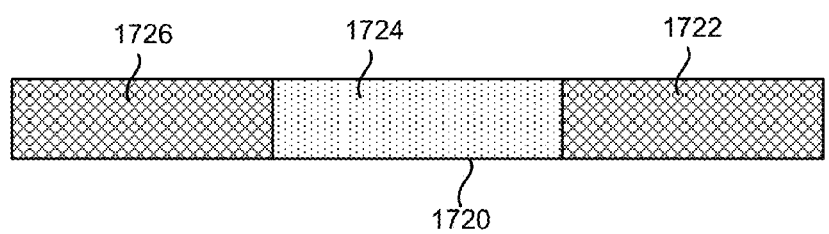
Figure 18A
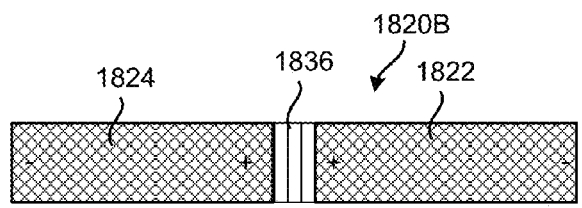
Figure 18B
Figure 18C
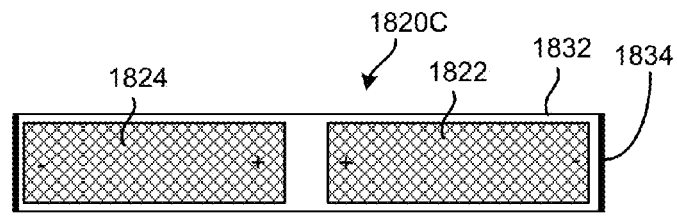

MICROPHONE AND CAMERA DISRUPTION APPARATUS AND METHOD

RELATED APPLICATIONS

This application is a continuation of U.S. patent application Ser. No. 14/276,288, filed on May 13, 2014 which is a continuation of U.S. patent application Ser. No. 14/102,387, filed Dec. 10, 2013, now U.S. Pat. No. 8,724,020, to which priority is claimed pursuant to 35 U.S.C. §119(e) and which are hereby incorporated herein by reference in their entireties.

SUMMARY

Embodiments are directed to an apparatus for use with an electronic device having a microphone and a camera. The apparatus comprises a structure configured to detachably couple to the device, and a shutter supported by the structure and comprising a lens shutter configured to obscure a lens of the camera when in an engaged position. A generator is supported by the structure and configured to generate a force that acts on the microphone and renders the microphone unresponsive to voice sounds.

Other embodiments are directed to an apparatus for use with an electronic device having a microphone and a camera. The apparatus comprises a structure configured to detachably couple to the device, and a shutter supported by the structure and movable between an engaged position and a non-engaged position. The shutter comprises a lens shutter configured to obscure a lens of the camera when in the engaged position. A generator is supported by the structure and configured to generate a force that acts on the microphone and renders the microphone unresponsive to voice sounds.

Further embodiments are directed to a method involving a microphone and a camera of an electronic device. The method comprises generating, at a cover or a sleeve detachably coupled to an external surface of the device, a force that is directed at the microphone, rendering the microphone unresponsive to voice sounds by the force acting on the microphone, and obscuring a lens of the camera while rendering the microphone unresponsive to voice sounds.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 16 shows a two-piece piston of a pressure generator in accordance with various embodiments;

FIG. 17 shows a three-piece piston of a pressure generator in accordance with various embodiments;

FIGS. 18A-18C show different configurations of a two-piece piston of a pressure generator in accordance with various embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Embodiments of the disclosure are directed to an apparatus and method for rendering a microphone and a camera of an electronic device temporarily unusable. Embodiments of the disclosure are directed to an apparatus and method for rendering a multiplicity of microphones and cameras of an electronic device temporarily unusable. According to various embodiments, a microphone and camera disruption apparatus is configured to render the microphone of an electronic device temporarily unresponsive to voice sounds and other audio sounds during a time in which privacy is desired. The microphone and camera disruption apparatus is further configured to render a camera of the device temporarily unusable by temporarily covering or obscuring a lens of the camera during a time in which privacy is desired.

In some embodiments, a microphone and camera disruption apparatus is fixed in position relative to the microphone(s) and camera(s) of an electronic device to which the apparatus is detachably affixed. In other embodiments, a microphone and camera disruption apparatus is moveable relative to the microphone(s) and camera(s) of an electronic device to which the apparatus is detachably affixed. In further embodiments, the camera disruption component of a microphone and camera disruption apparatus is movable, while the microphone disruption component of the apparatus is fixed. In still other embodiments, the microphone disruption component of a microphone and camera disruption apparatus is movable, while the camera disruption component of the apparatus is fixed.

Figure 1:
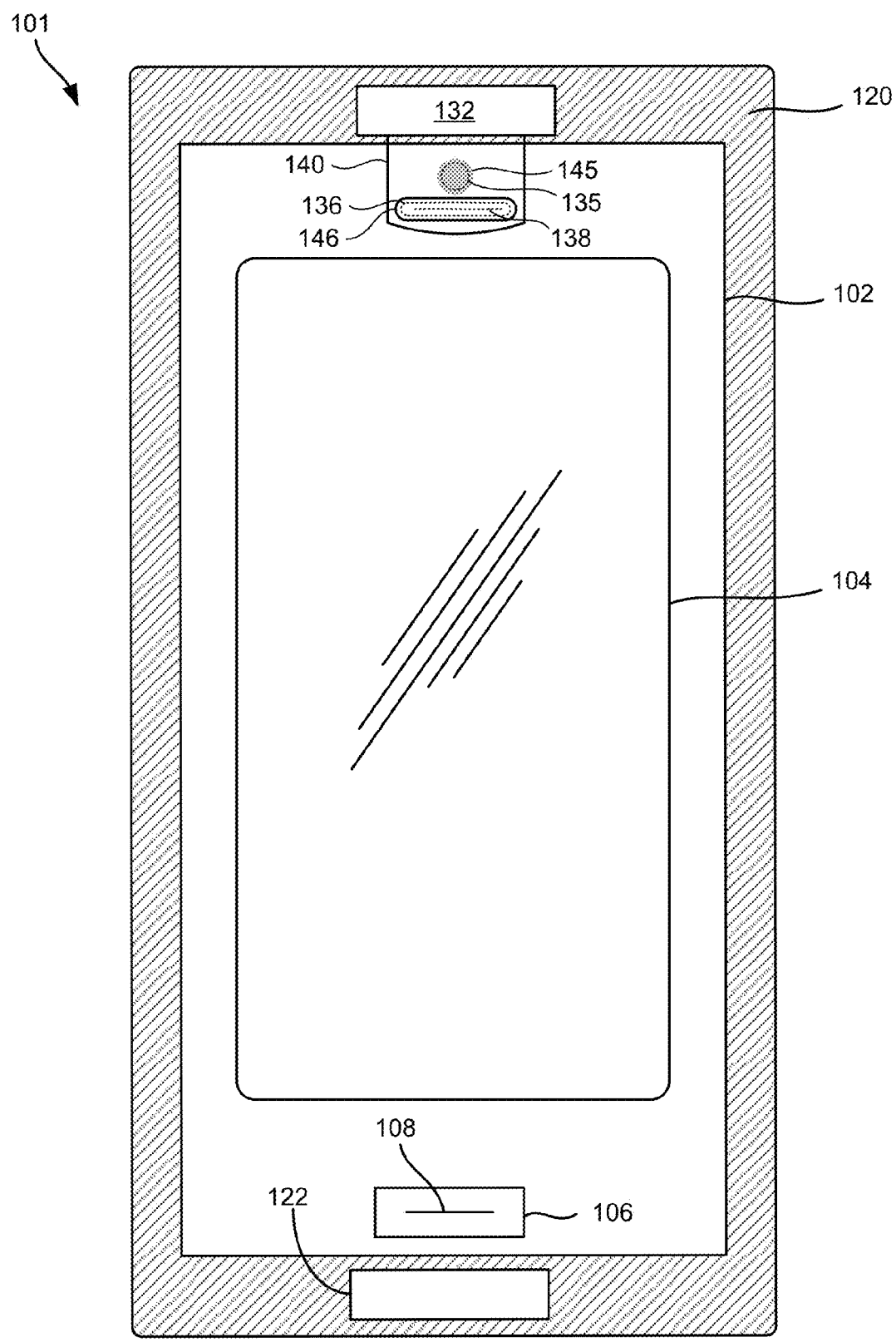
FIG. 1 is an illustration of a microphone and camera disruption apparatus for use with an electronic device having a microphone and a camera in accordance with various embodiments.

FIG. 1 is an illustration of a microphone and camera disruption apparatus for use with an electronic device having a microphone and a camera in accordance with various embodiments. The apparatus 101 illustrated in FIG. 1 is shown detachably coupled to a hand-held electronic device 102, which includes a display 104, two microphones 106 (lower) and 136 (upper), and a front camera 135. The microphones 106 and 136 are illustrated as each having a diaphragm 108, 138 or other sensing element that is responsive to sounds waves, such as those associated with human voice sounds, music or other audio information. The apparatus 101 is coupled to the electronic device 102 so that at least a portion of the apparatus 101 is proximate to the microphones 106, 136 and the camera 135. According to various embodiments, the apparatus 101 can be configured as a support structure 120, such as a sleeve, a band or a cover, that can be detachably affixed to the housing of the electronic device 102. For example, the support structure 120 can be implemented as a two-part case or cover with includes snap-fit features to allow the support structure 120 to be attached and detached from the electronic device 102. The support structure 120 is configured to support the various components of the microphone and camera disruption apparatus.

The apparatus 101 includes a first generator 122 and a second generator 132, which are supported by the support structure 120. The generators 122 and 132 are located on the support structure 120 such that the generators 122 and 132 are respectively positioned adjacent the microphones 106 and 136 when the support structure 120 is properly coupled to the device 102. The generators 122 and 132 are configured to produce a force that temporarily renders the microphones 106 and 136 unresponsive to voice sounds, music, and other audio source information. It is understood that some embodiments include a single generator 122 configured to operate on a single microphone.

In the representative embodiment shown in FIG. 1, electronic device 102 includes a front camera 135 situated near the upper edge surface of the device 102. The device 102 also includes an upper microphone 136 having an inlet port near the front camera 135. When the support structure 120 is properly coupled to the device 102, a shutter 140 extends over a portion of the front surface of the electronic device 102 so that the shutter 140 covers the front camera 135 and the microphone 136. The shutter 140 can be formed from a transparent plastic or painted plastic (e.g., in a color that matches the border region of the device 102). In some embodiments, the shutter 140 includes a plenum extending from the generator 132 to an outlet port 146 of the shutter 140. In such embodiments, the outlet port 146 has a configuration corresponding to that of an inlet port of the microphone 136 and can include a seal or gasket to enhance fluidic sealing between the outlet port 146 and the inlet port of the microphone 136.

According to some embodiments, the shutter 140 comprises an electro-optical element 145, such as a liquid crystal element, that shutters the lens of the camera 135 by changing from clear to opaque, or becomes diffusive, upon receiving an electrical stimulus. Use of an electro-optical element 145 as a lens shutter is particularly useful in embodiments where the shutter 140 is fixed. In other embodiments, as will be described hereinbelow, the shutter 140 is movable. In such movable embodiments, the lens shutter 145 may comprise an electro-optical element or may comprise a coating or insert of opaque or diffuse material.

In accordance with various embodiments, the generators 122, 132 and the lens shutter 145 can be selectively activated and deactivated by the user of the electronic device 102. For example, the generators 122, 132 and the lens shutter 145 can be coupled to a switch that is supported by the support structure 120 and actuatable by a user. Actuation of the switch cause concurrent activation and deactivation of the generators 122, 132 and the lens shutter 145. Although not shown in FIG. 1, the support structure 120 incorporates a power source, such as a battery, which is coupled to the generators 122, 132, the lens shutter 145, and the switch.

The generators 122, 132 are configured to produce a force that acts on the microphones 106, 136, and renders the microphones 106, 136 unresponsive to voice sounds and other acoustic information. The force produced by the generators 122, 132 provides for continuous disruptive interference of microphone operation until the generators 122, 132 are deactivated. Upon deactivation of the generators 122, 132, the microphones 106, 136 of the electronic device 102 return to normal operation. In this regard, the generators 122, 132 deliver a nondestructive force that temporarily renders the microphones 106, 136 unusable for purposes of transducing voice and other human perceivable acoustic information. It is understood that the microphone and camera disruption apparatus shown in FIG. 1 can include an additional shutter (and optionally another generator) deployed on the rear surface of the electronic device 102 (as is shown in other figures).

According to various embodiments, the generators 122, 132 generate a force that acts on the diaphragms 108, 138 of the microphones 106, 136, and renders the diaphragms 108, 138 unresponsive to voice sounds and other acoustic information. The generators 122, 132, according to some embodiments, generate a force that causes clipping of the microphones 106, 136. For example, the generators 122, 132 may generate a force that causes repeated intermittent clipping of the microphones 106, 136 at a rate that renders the microphone unresponsive to voice sounds and other acoustic information. The generators 122, 132, for example, can generate a force that causes the diaphragms 108, 138 to move to or near to a maximum excursion limit of the diaphragms 108, 138. For example, the generators 122, 132 can generate a force that causes the diaphragms 108, 138 to move cyclically between opposing maximum excursion limits of the diaphragms 108, 138, making contact or near contact with these excursion limits. In other embodiments, the generators 122, 132 can generate a force that causes nonlinear distortion of the microphones' output signal. In some embodiments, the force generated by the generators 122, 132 is air pressure. In other embodiments, the force generated by the generators 122, 132 is an electric force. In further embodiments, the force generated by the generators 122, 132 is mechanical force, such as vibration.

Figure 2A:
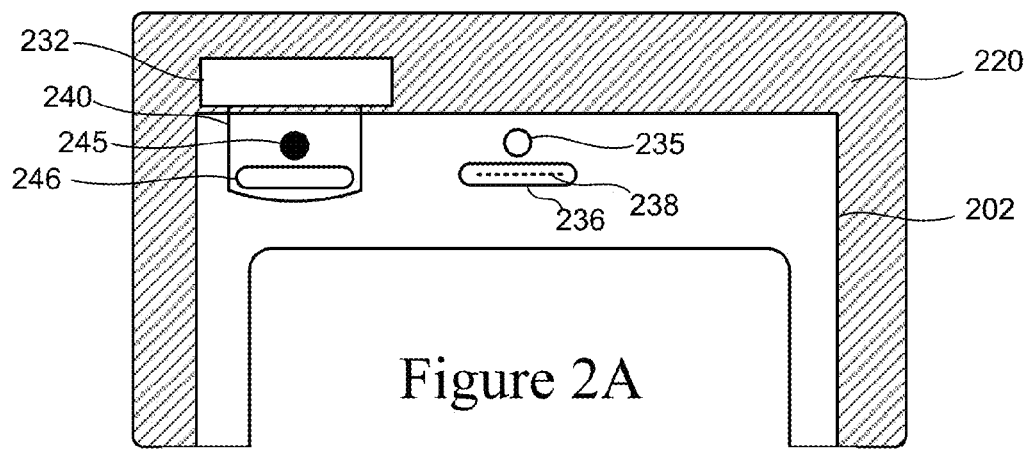
FIGS. 2A-2C illustrate a movable microphone and camera disruption apparatus for use with an electronic device having a microphone and a camera at different positions between non-engagement and engagement states in accordance with various embodiments.
Figure 2B:
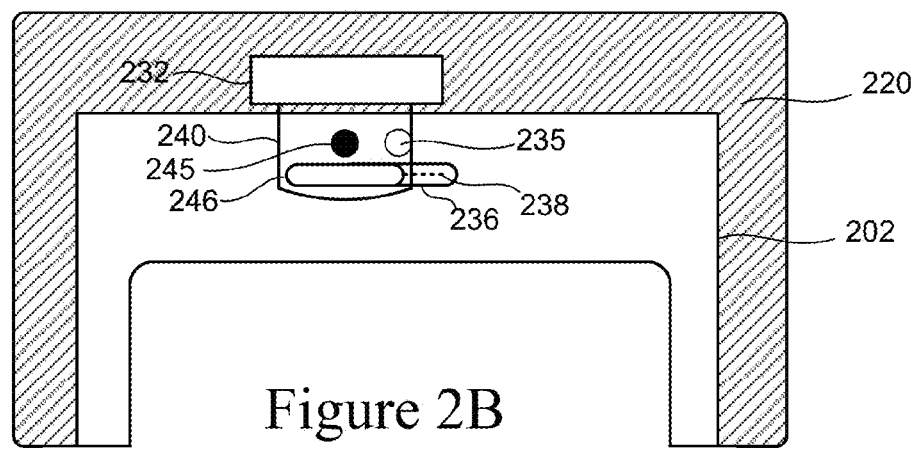
Figure 2C:
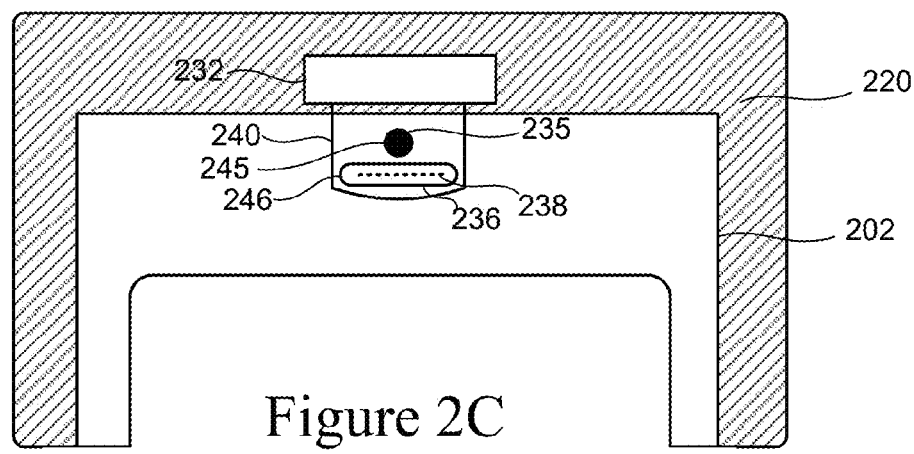

FIGS. 2A-2C are illustrations of a microphone and camera disruption apparatus for use with an electronic device having a microphone and a camera in accordance with various embodiments. In FIGS. 2A-2C, the microphone and camera disruption apparatus includes a movable shutter 240 shown at various stages of advancement between a non-engaged position and engaged position. In various embodiments, a generator 232 is configured to travel with the movable shutter 240. The generator 232 in this regard can be considered part of the shutter 240 or otherwise attached to the shutter 240. In some embodiments, the shutter 240 includes a plenum that can be pressurized by the generator 232 and pressurized air can be directed out of an outlet port 246. Configuring the generator 232 to travel with the shutter 240 allows for continuous fluidic coupling between the generator 232 and an inlet port of the plenum of the shutter 240, since the plenum travels with the generator 232. This configuration eliminates a potential leakage situation between the inlet port of the plenum and the generator 232. In other embodiments, the shutter 240 includes a channel within which an electrical lead arrangement runs between the generator 232 and an electrical or in electro-mechanical element 246 supported by the shutter 240. The shutter 240 further includes a lens shutter 245, which can be an opaque or diffuse portion of the shutter 240 (e.g., opaque paint or insert material). Alternatively, the lens shutter 245 can include an electro-optical element, such as a liquid crystal element.

FIG. 2A shows the shutter 240 in a non-engaged position, such that the shutter 240 is spaced away from the microphone 236 and camera 235 of the electronic device 202. FIG. 2B shows the shutter 240 in a partially engaged position, such that the shutter 240 partially covers the microphone 236 and camera 235. FIG. 2C shows the shutter 240 in an engaged position, such that the shutter 240 is positioned over the microphone 236 and camera 235. In the engaged position, the shutter 240 can deliver a force capable of temporarily disrupting operation of the microphone 236 and can also obscure the lens of the camera 235 via the lens shutter 245. In some embodiments, the shutter 240 is configured for translation between the non-engaged and engaged positions by way of manual effort (e.g., a user's thumb). In other embodiments, an electro-mechanical mechanism can be included within the support structure 222 to provide automated translation of the shutter 240 between non-engaged and engaged positions.

Figure 3A:
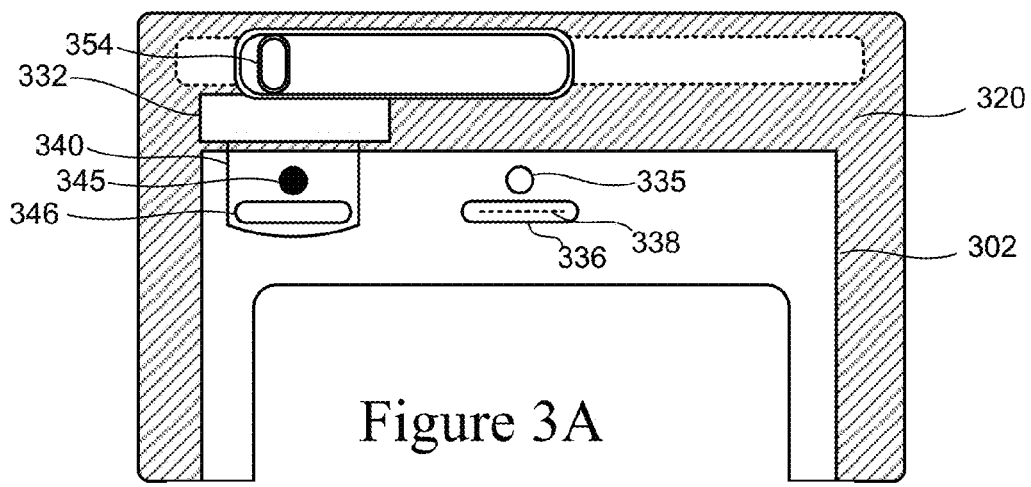
FIGS. 3A-3C illustrate a movable microphone and camera disruption apparatus for use with an electronic device having a microphone and a camera at different positions between non-engagement and engagement states in accordance with other embodiments.
Figure 3B:
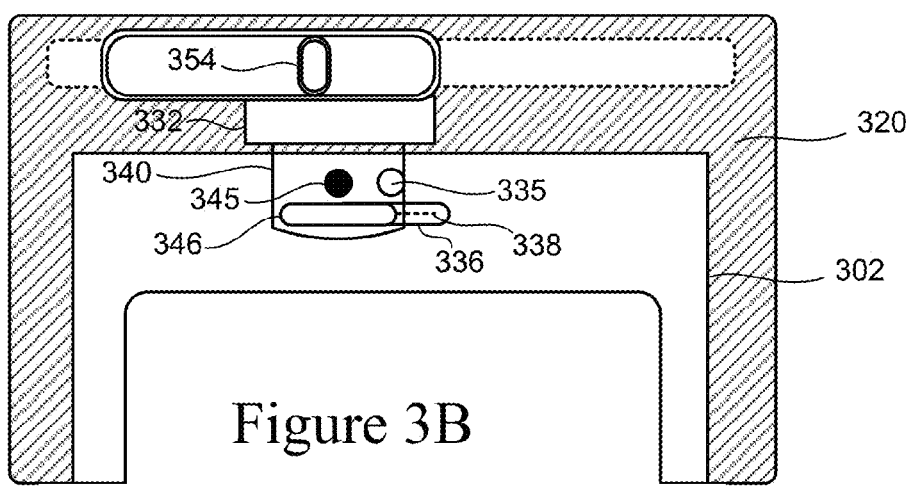
Figure 3C:
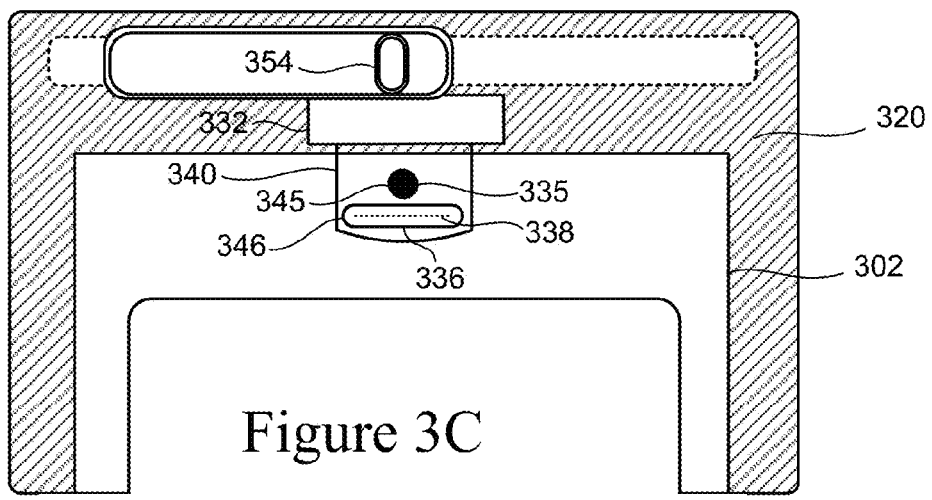

FIGS. 3A-3C are illustrations of a microphone and camera disruption apparatus for use with an electronic device having a microphone and a camera in accordance with various embodiments. In FIGS. 3A-3C, the microphone and camera disruption apparatus includes a movable shutter 340 shown at various stages of advancement between a non-engaged position and engaged position. In various embodiments, the shutter 340 and the generator 332 are configured to travel in tandem. The shutter 340 and the generator 332 are connected to a slider 354 which can be manually slid between a non-engaged position and an engaged position. In some embodiments, the shutter 340 includes a plenum that can be pressurized by the generator 332 and directed out of an outlet port 346. In other embodiments, the shutter 340 includes a channel within which an electrical lead arrangement runs between the generator 332 and an electrical or in electro-mechanical element 346 supported by the shutter 340. The shutter 340 further includes a lens shutter 345, which can be an opaque or diffuse portion of the shutter 340 (e.g., opaque paint or insert material). Alternatively, the lens shutter 345 can include an electro-optical element, such as a liquid crystal element.

FIG. 3A shows the shutter 340 in a non-engaged position, such that the shutter 340 is spaced away from the microphone 336 and camera 335 of the electronic device 302. A manual force applied to the slider 354 in the direction of the camera 335 causes the shutter 340 and generator 332 to move toward the camera 335, as shown in FIG. 3B. FIG. 3B shows the shutter 340 in a partially engaged position, such that the shutter 340 partially covers the microphone 336 and camera 335. FIG. 3C shows the shutter 340 in an engaged position, such that the shutter 340 is positioned over the microphone 336 and camera 335. In the engaged position, the shutter 340 can deliver a force capable of temporarily disrupting operation of the microphone 336 and can also obscure the lens of the camera 335 via the lens shutter 345.

Figure 4A:
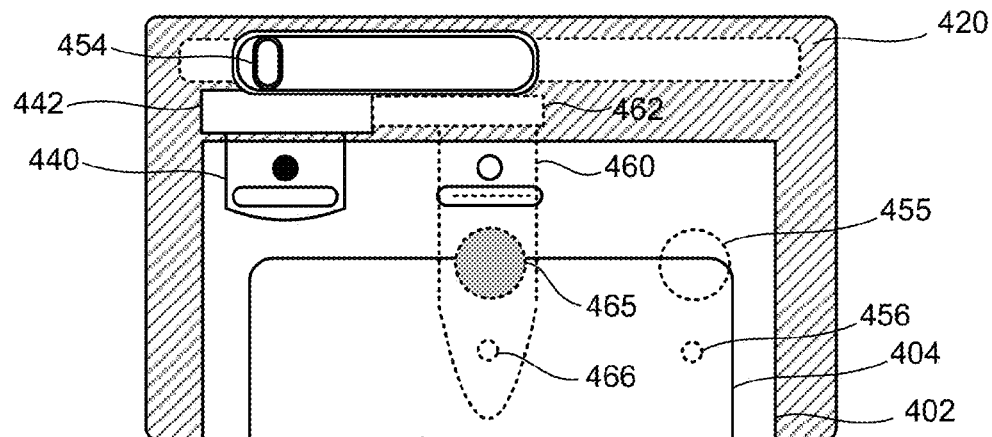
FIGS. 4A-4C illustrate a movable microphone and camera disruption apparatus for use with an electronic device having a multiplicity of microphones and cameras at different positions between non-engagement and engagement states in accordance with various embodiments.
Figure 4B:
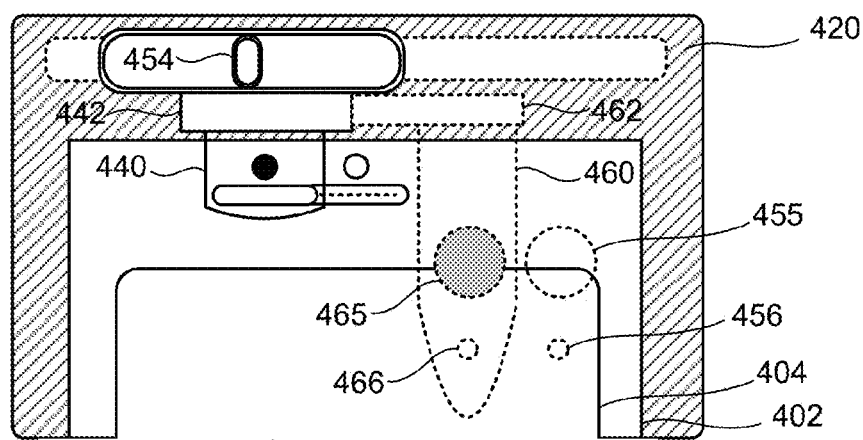
Figure 4C:
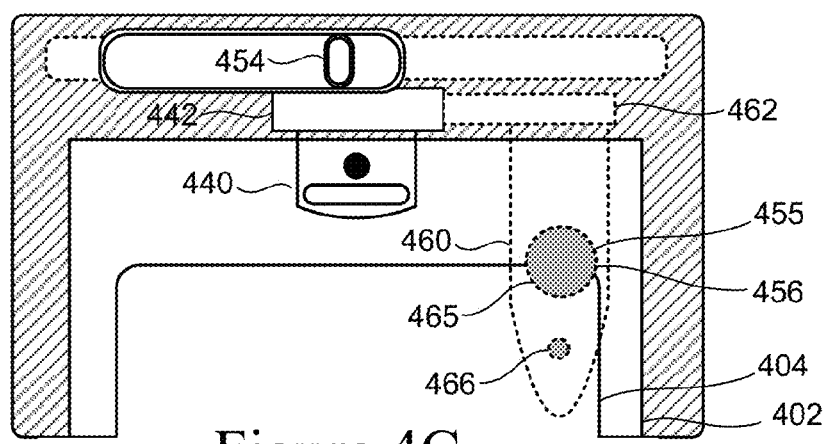

FIGS. 4A-4C are illustrations of a microphone and camera disruption apparatus for use with an electronic device having a microphone and a camera in accordance with various embodiments. In FIGS. 4A-4C, the microphone and camera disruption apparatus includes two movable shutters 440 and 460 (shown in phantom). Shutter 440 serves to provide microphone and camera disruption for a first major surface (e.g., front) of the electronic device 402 and shutter 460 serves to provide microphone and camera disruption for a second major surface (rear) of the device 402. The front shutter 440 moves and functions as previously described, moving in tandem with the slider 454. The rear shutter 460 is connected to the slider 454 and moves in concert with the front shutter 440 as the slider 454 is translated axially by the user of the electronic device 402.

In some embodiments, a single generator 442 is coupled to the front and rear shutters 440 and 460, and travels with the two shutters 440 and 460 in response to movement of the slider 454. In other embodiments, a first generator 442 is coupled to the front shutter 440 and a second generator 462 is coupled to the rear shutter 460, and both generators 442 and 462 travel with the two shutters 440 and 460 in response to movement of the slider 454.

The rear shutter 460 includes a lens shutter 465, which can be an opaque or diffuse portion of the shutter 460 (e.g., opaque paint or insert material). Alternatively, the lens shutter 465 can include an electro-optical element, such as a liquid crystal element. The rear shutter 460 also includes a force delivery feature 466 which, when positioned over a rear microphone 456 of the device 402, renders the microphone 456 temporarily unresponsive to voice sounds and other acoustic information during a time in which the generator 442 (or 462) is operating. In some embodiments, the rear shutter 460 includes a plenum that can be pressurized by the generator 442 (or 462) and directed out of an outlet port 466. In other embodiments, the shutter 460 includes a channel within which an electrical lead arrangement runs between the generator 442 (or 462) and an electrical or in electro-mechanical element 466 supported by the shutter 460.

FIG. 4A shows the shutters 440 and 460 in a non-engaged position, such that the shutters 440 and 460 are spaced away from microphones and cameras on the front and rear surface of the electronic device 402. A manual force applied to the slider 454 in the direction of the front camera, for example, causes the front and rear shutters 440 and 460 and generator 442 (and 462 if present) to move toward their respective destination cameras and microphones, as shown in FIG. 4B. FIG. 4B shows the shutters 440 and 460 in a partially engaged position, such that the shutters 440 and 460 partially cover their respective destination cameras and microphones. FIG. 4C shows the shutters 440 and 460 in an engaged position, such that the front shutter 440 is positioned over its destination microphone and camera, and the rear shutter 460 is positioned over its destination microphone 456 and camera 455. In the engaged position, the shutters 440 and 460 can deliver a force capable of temporarily disrupting operation of their respective destination microphones and can also obscure the lens of their destination cameras.

Figure 5:
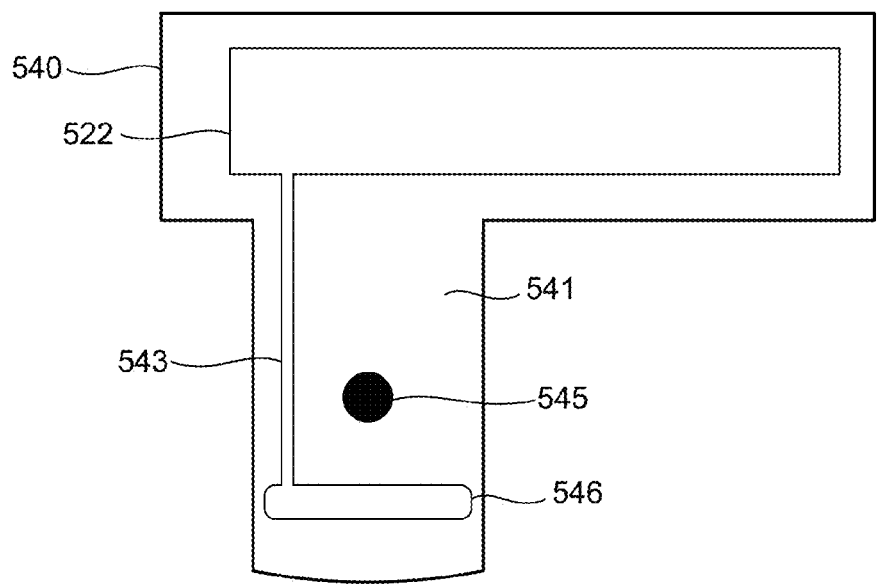
FIG. 5 illustrates a plenum configured to fluidly couple a microphone and camera disruption apparatus to a microphone and obscure a lens of a camera of an electronic device in accordance with various embodiments.

FIG. 5 illustrates a plenum 540 configured to fluidly couple a microphone and camera disruption apparatus to a microphone of an electronic device in accordance with various embodiments. The plenum 540 is configured to provide fluidic coupling between an air pressure generator 522 and a microphone disposed at or just below a surface of the device housing. For example, the microphone may be disposed on a front major surface of the device housing near the upper edge surface of the device housing. The plenum 540 shown in FIG. 5 includes a void or channel 543 that extends between the generator 522 and an outlet port 546, and can be pressurized by the generator 522. The outlet port 546 is configured to generally conform to the shape of the microphone's inlet port. The outlet port 546 may include a seal or gasket to enhance fluidic coupling with the microphone. The plenum 540 further includes a lens shutter 545 configured to cover or obscure the lens of a camera of the electronic device. As discussed previously, the lens shutter 545 can be an opaque or diffuse portion of the shutter 540 (e.g., opaque paint or insert material) or an electro-optical element, such as a liquid crystal element.

Figure 6:
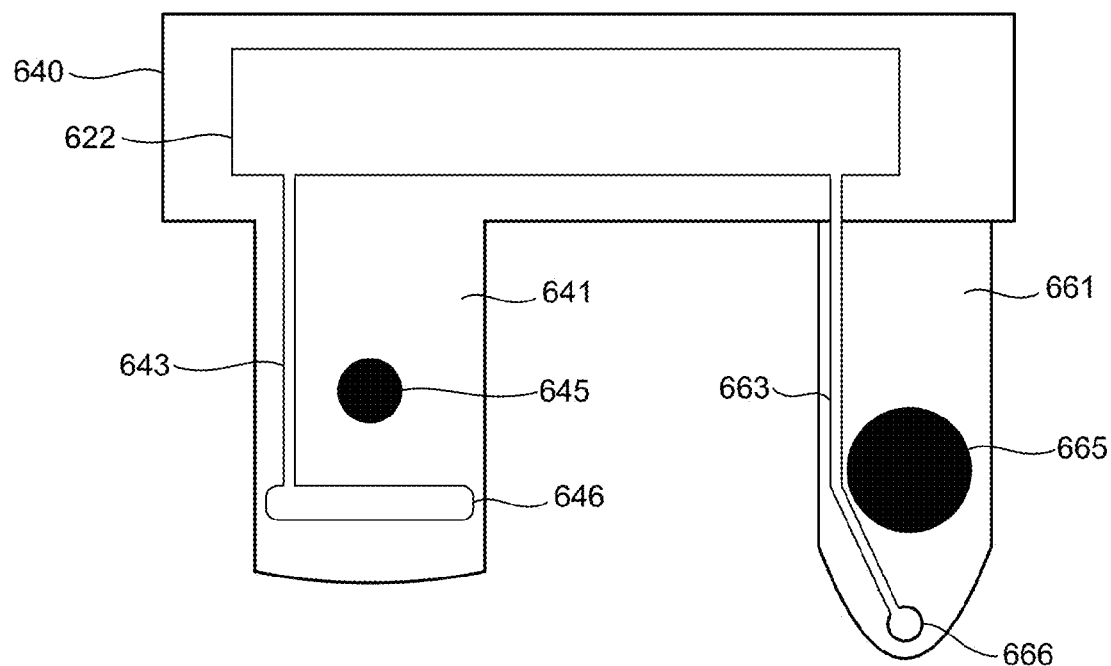
FIG. 6 illustrates a plenum configured to fluidly couple a microphone and camera disruption apparatus to a multiplicity of microphones and obscure lenses of a multiplicity of cameras of an electronic device in accordance with various embodiments.

FIG. 6 illustrates a manifold 640 comprising a multiplicity of plenums configured to fluidly couple an air pressure generator 622 to a multiplicity of electronic device microphones in accordance with various embodiments. The manifold 640 includes a first plenum 641 and a second plenum 661. The first and second plenums 641 and 661 each define a void or channel 643 and 663 in the manifold material, which can be pressurized by an individual or a common generator of a type previously described. The first plenum 641 provides fluidic coupling between the generator 622 and a first microphone of the electronic device. The first plenum 641 is shown to include an outlet port 646 which has a shape similar to that of the inlet port of a first microphone of the electronic device (which may be on a front surface of the electronic device housing). The outlet port 646 may further include a seal arrangement to provide enhanced fluidic coupling between the plenum 641 and the inlet port of the first microphone. The second plenum 661 is shown to include an outlet port 666 which has a shape similar to that of the inlet port of a second microphone of the electronic device (which may be provided on a different surface of the electronic device housing, such as a rear surface). The outlet port 666 may further include a seal arrangement to provide enhanced fluidic coupling between the second plenum 661 and the inlet port of the second microphone.

In the representative embodiment shown in FIG. 6, a common generator 622 is configured to fluidly couple to the first and second plenums 641 and 661. In some embodiments, the first and second plenums 641 and 661 can be fluidly independent of each other, such that each is coupled to a different generator.

Each of the first and second plenums 641 and 661 further include a lens shutter 645 and 665 configured to cover or obscure the lens of a camera of the electronic device. In some embodiments, the first plenum 641 is configured to interact with a microphone and a camera on a first major surface (e.g., front) of an electronic device, and second plenum 661 is configured to interact with a microphone and a camera on a second major surface (e.g., rear) of the electronic device As discussed previously, the lens shutters 645 and 665 can be an opaque or diffuse portion of the shutter 641 and 661 (e.g., opaque paint or insert material) or an electro-optical element, such as a liquid crystal element.

Figure 7:
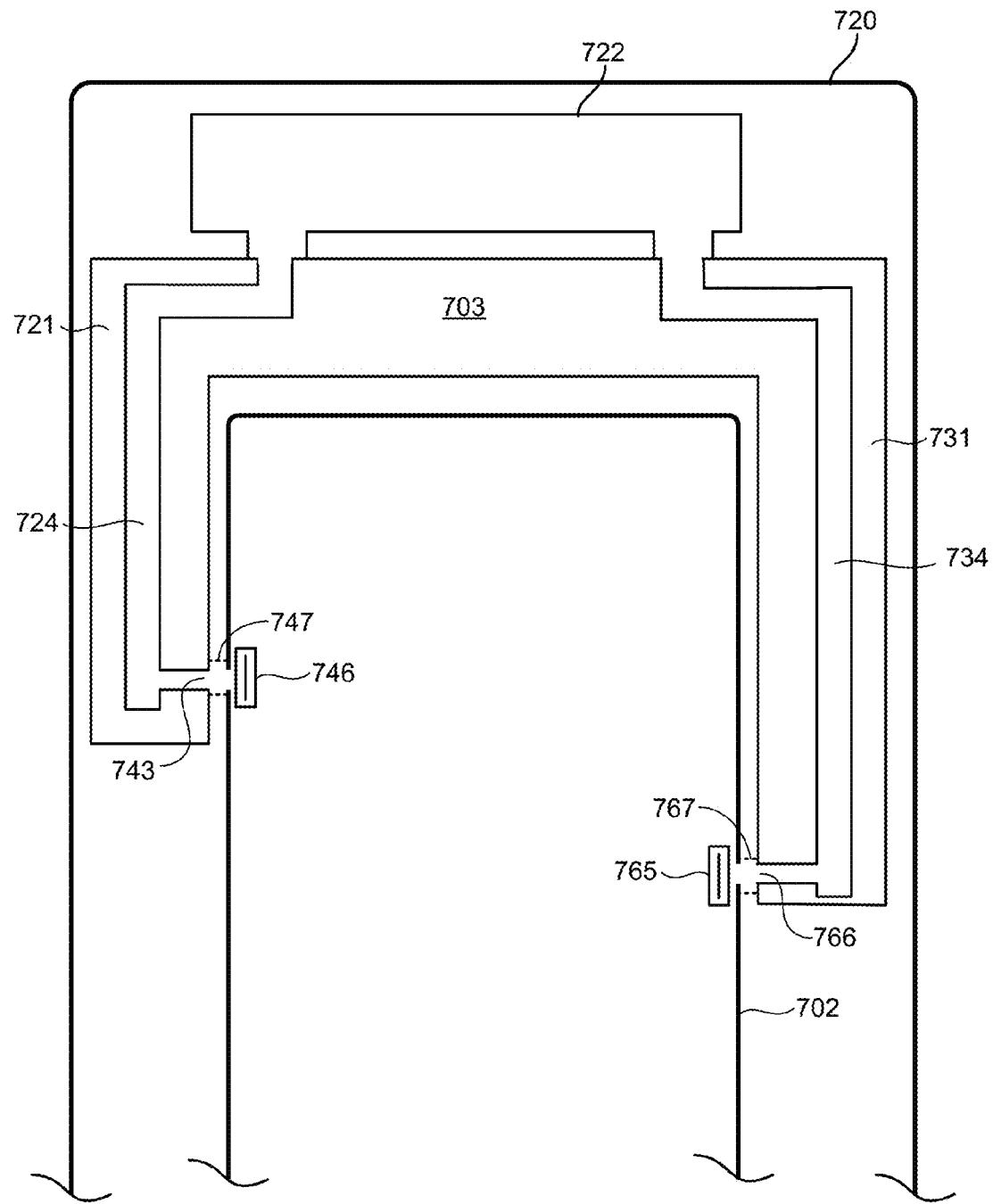
FIG. 7 is a side view of a manifold comprising a multiplicity of plenums configured to fluidly couple a microphone and camera disruption apparatus to a multiplicity of microphones disposed on opposing major surfaces of an electronic device in accordance with various embodiments.

FIG. 7 is a side view of a manifold 703 comprising a multiplicity of plenums configured to fluidly couple an air pressure generator 722 to a multiplicity of electronic device microphones in accordance with various embodiments. Although not shown in FIG. 7, at least some of the plenums of the manifold 703 include a lens shutter of a type previously described. FIG. 7 demonstrates that a microphone and camera disruption apparatus according to various embodiments can employ plenums having fairly complex configurations depending on the positioning of one or more microphones of an electronic device to which the apparatus is detachably affixed. The manifold 703 and generator 722 are shown mounted within a cover 720 which is configured to be detachable affixed to an electronic device 702 having a first microphone 746 and a second microphone 765. The manifold 703 includes a first plenum 721 and a second plenum 731. The first and second plenums 721 and 731 each define a void or channel 724, 734 in the manifold material, which can be pressurized by an individual or a common generator (e.g., generator 722) of a type previously described. The first plenum 721 provides fluidic coupling between the generator 722 and the first microphone 746 of the electronic device 702. The first plenum 721 is shown to include an outlet port 743 which has a shape similar to that of the inlet port of a first microphone 746 (which may be on a front surface of the electronic device housing). The outlet port 743 may further include a seal arrangement 747 to provide enhanced fluidic coupling between the plenum 721 and the inlet port of the first microphone 746. The second plenum 731 is shown to include an outlet port 766 which has a shape similar to that of the inlet port of the second microphone 765 (which may be provided on a different surface of the electronic device housing, such as a rear surface). The outlet port 766 may further include a seal arrangement 767 to provide enhanced fluidic coupling between the second plenum 731 and the inlet port of the second microphone 765.

Figure 8:
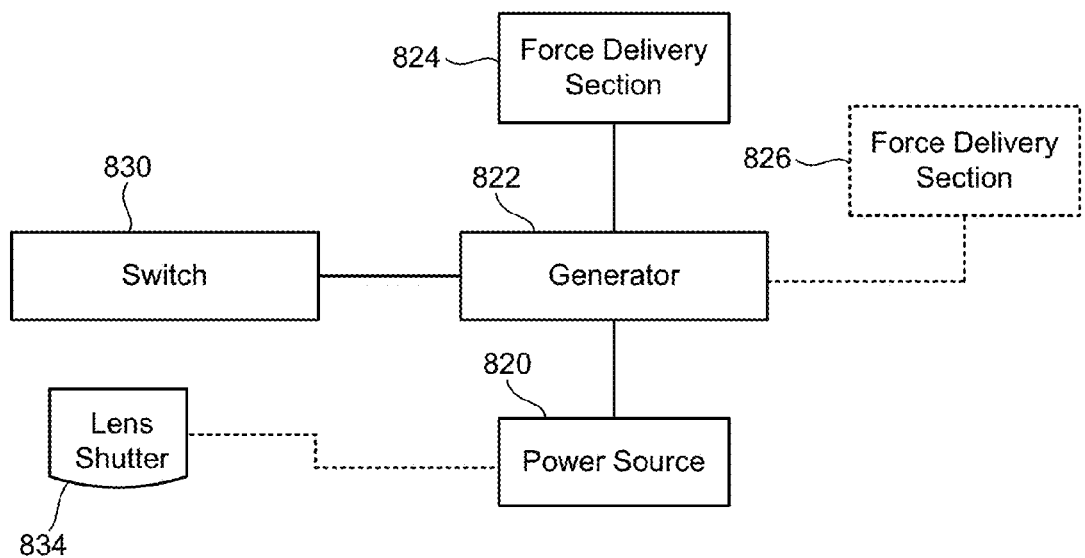
FIG. 8 is a block diagram showing various components of a microphone and camera disruption apparatus in accordance with some embodiments.

FIG. 8 is a block diagram showing various components of a microphone and camera disruption apparatus in accordance with some embodiments. The microphone and camera disruption apparatus shown in FIG. 8 includes a generator 822, which can be a pressure, electric or mechanical force generator for example. The generator 822 is coupled to one or more force delivery sections or elements 824, 836. Examples of force delivery sections or elements 824, 836 include a pressure outlet port, a vibration element or an electrical element (e.g., a charge plate). The generator 822 and/or one or more of the force delivery sections or elements 824, 836 are coupled to a power source 820, such as a battery. The microphone and camera disruption apparatus shown in FIG. 8 includes a shutter 834 which supports a passive or active (e.g., electro-optical element) lens shutter arrangement. A switch 830 is coupled to the generator 822 and power source 820, providing for selective activation and deactivation of the microphone and camera disruption apparatus. In some embodiments, the shutter 834 serves as the switch 830, such that moving the shutter 834 (e.g., via a slider) between an initial non-engaged position and an engaged position powers up and down the generator and active lens shutter (if present).

Figure 9:
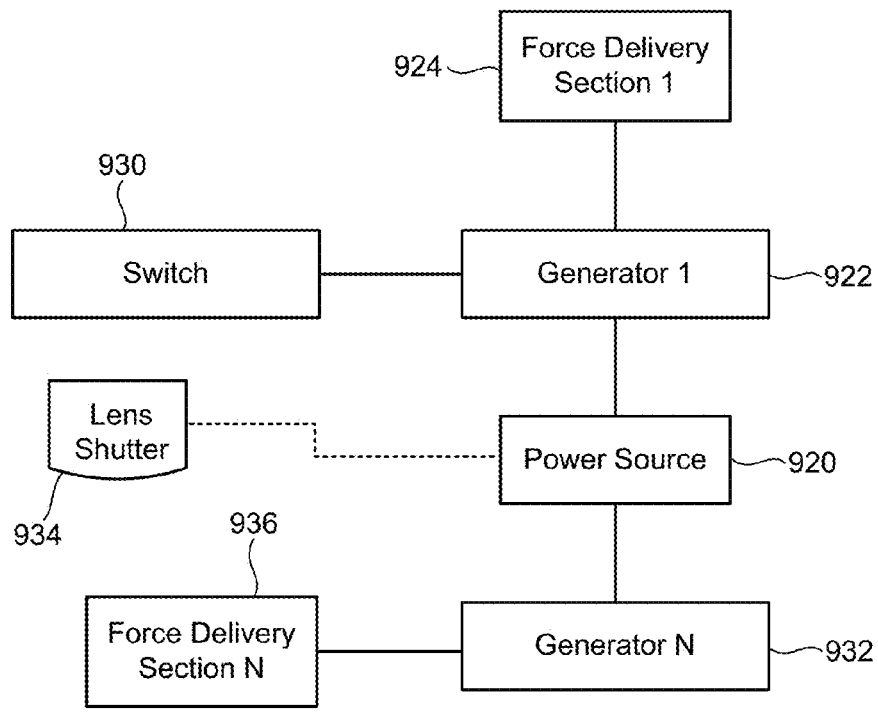
FIG. 9 is a block diagram showing various components of a microphone and camera disruption apparatus in accordance with some embodiments.

FIG. 9 is a block diagram showing various components of a microphone and camera disruption apparatus in accordance with other embodiments. The microphone and camera disruption apparatus shown in FIG. 9 includes a multiplicity of generators 922 and 932, which can be a pressure, electric or mechanical force generator for example (e.g., the same type or different types). The generators 922, 932 are coupled to respective force delivery sections or elements 924, 936 (e.g., a pressure outlet port, a vibration element or an electrical element). The generators 922, 932 and/or one or more of the force delivery sections or elements 924, 936 are coupled to a power source 920, such as a battery. A switch 930 is coupled to the generators 922, 932 and power source 920, providing for selective activation and deactivation of the microphone and camera disruption apparatus. In some embodiments, the shutter 934 serves as the switch 930, such that moving the shutter 934 (e.g., via a slider) between an initial non-engaged position and an engaged position powers up and down the generator and active lens shutter (if present).

Figure 10:
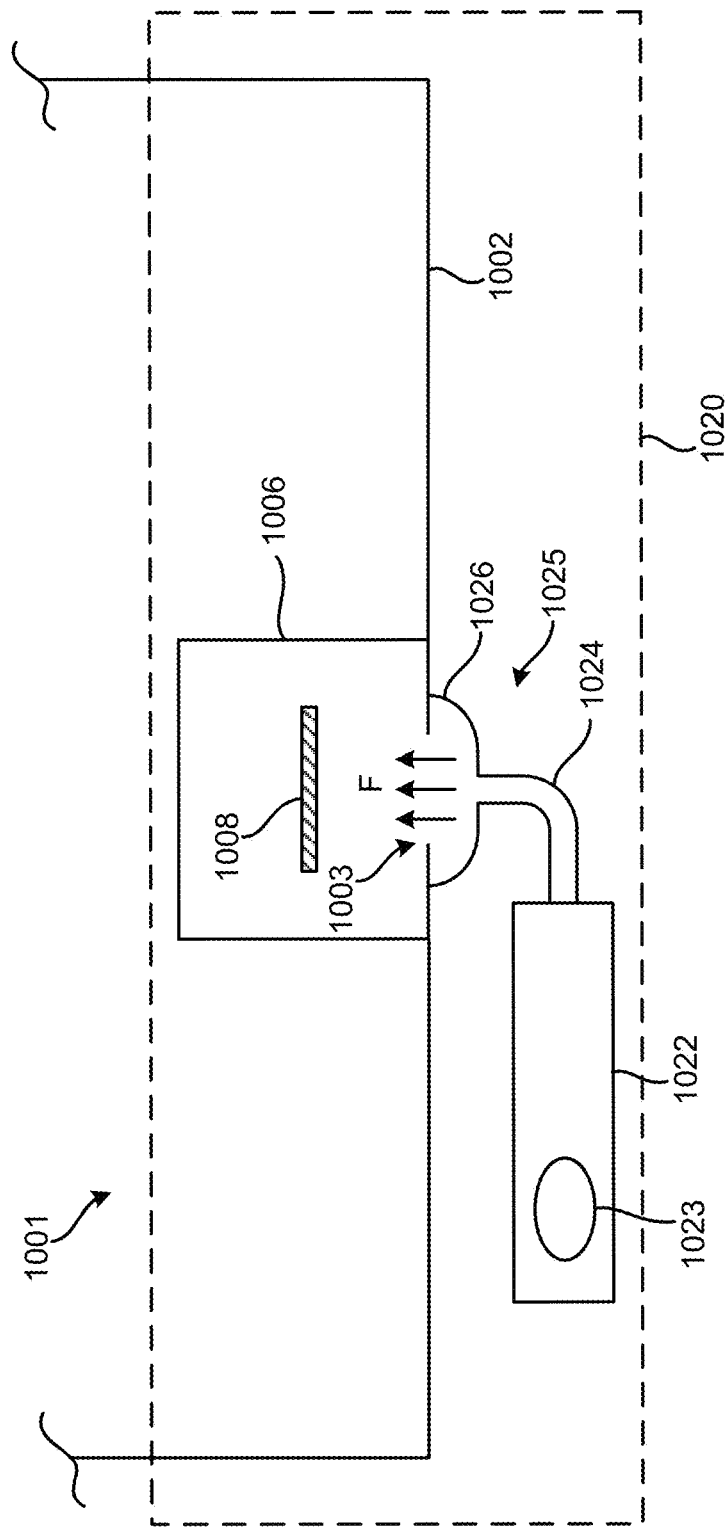
FIG. 10 illustrates various details of a microphone and camera disruption apparatus for use with an electronic device having a microphone and a camera in accordance with various embodiments.

FIG. 10 illustrates additional details of a microphone and camera disruption apparatus for use with an electronic device having a microphone in accordance with various embodiments. The apparatus 1001 includes a support structure 1020 configured to detachably couple to the housing of the electronic device 1002. When the apparatus 1001 is properly arranged on the device 1002, the generator 1022 is positioned proximate the inlet port 1003 of the microphone 1006. Alternatively, the generator 1022 can be positioned away from the microphone's inlet port 1003, and fluidly coupled to the microphone 1006 via a coupling arrangement 1025.

In the illustrative embodiment shown in FIG. 10, the inlet port 1003 of the microphone 1006 is located on the lower edge surface of the housing of the electronic device 1002. The generator 1022 is coupled to the inlet port 1003 of the microphone 1006 via the coupling arrangement 1025. A switch 1023 allows a user to manually activate and deactivate the generator 1022 as desired. In some implementations, the switch 1023 is located at the generator 1022. In other implementations, the switch 1023 is located elsewhere on support structure 1020.

According to embodiments that employ air pressure, the coupling arrangement 1025 includes a plenum or channel 1024 and an outlet port 1026, which is configured to sealingly engage the housing surface of the electronic device 1002 proximate the inlet port 1003 of the microphone 1006. According to embodiments that employ an electric field, the coupling arrangement 1025 includes an electrical element 1026 couple to the generator 1022 via an electrical connection 1024. According to embodiments that employ mechanical vibration, the coupling arrangement 1025 includes a mechanical vibrator 1026 couple to the generator 1022 via an electrical or structural connection 1024, depending on the particular vibrator design. As is shown in FIG. 10, the generator 1022 produces a force, F, that impinges the diaphragm 1008 or other acoustic energy sensing member of the microphone 1006, thereby rendering the microphone 1006 unresponsive to voice sounds. It is understood that element providing the pressure, electrical or mechanical force on the microphone is generally not in direct contact with the diaphragm of the microphone, and is typically located at or near the surface of an electronic device's housing separated by a small gap from the diaphragm.

Figure 11:
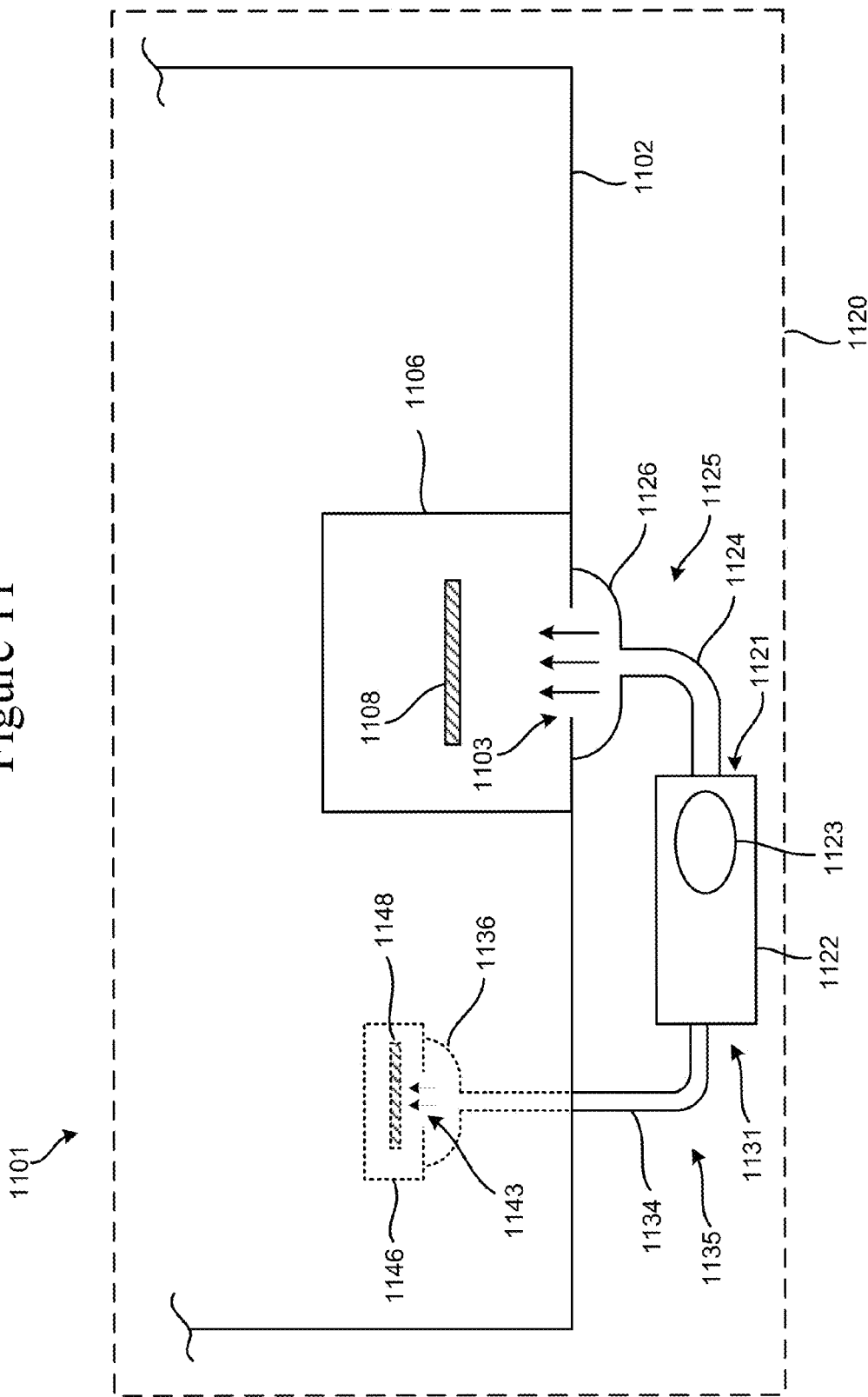
FIG. 11 illustrates various details of a microphone and camera disruption apparatus for use with an electronic device having a multiplicity of microphones in accordance with various embodiments.

FIG. 11 illustrates additional details of a microphone and camera disruption apparatus for use with an electronic device having a microphone in accordance with other embodiments. The apparatus 1101 includes a support structure 1120 configured to detachably couple to the housing of the electronic device 1102. The support structure 1120 may be a sleeve or partial cover according to various embodiments, while in other embodiments the support structure 1120 can be a full cover. In the embodiment shown in FIG. 11, the support structure 1120 supports a generator 1122 configured to disruptively interfere with a multiplicity of device microphones 1106, 1146 positioned on different surfaces of the electronic device 1102. In the representative example shown in FIG. 11, the electronic device 1120 includes a lower microphone 1106 having an inlet port 1103 located on a lower edge surface of the device housing. A rear microphone 1146 having an inlet port 1143 is situated on a rear surface of the housing of the device 1102.

The generator 1122 includes a first coupling arrangement 1125 provided between the inlet port 1103 of the lower microphone 1106 and a first port 1121 of the generator 1122. The generator 1122 also includes a second coupling arrangement 1135 provided between the inlet port 1143 of the rear microphone 1146 and a second port 1131 of the generator 1122. When activated, such as by actuation of a switch 1123, the generator 1122 causes a disruptive force to be delivered to the diaphragms 1108, 1148 of the lower and rear microphones 1106, 1146, respectively. The lower and rear microphones 1106 and 1146 return to normal operation upon the deactivation of the generator 1122, such as via actuation of the switch 1123.

Figure 12:
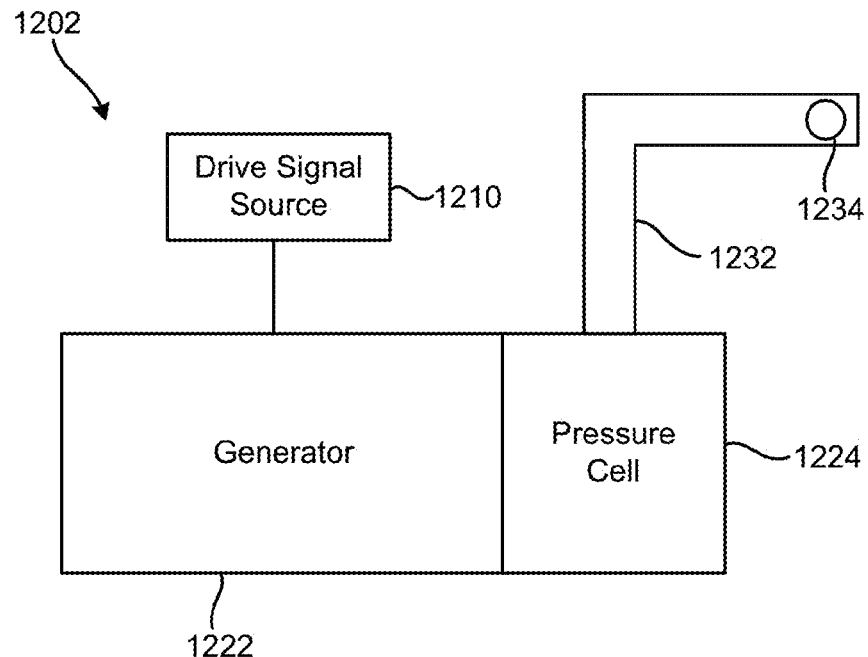
FIG. 12 is an illustration of a microphone and camera disruption apparatus that employs air pressure for use with an electronic device having a microphone and camera in accordance with various embodiments.

Turning now to FIG. 12, there is illustrated various components of a microphone and camera disruption apparatus 1202 in accordance with various embodiments. The apparatus 1202 includes a generator 1222 coupled to a pressure cell 1224. The generator 1222 receives a drive signal from a drive signal source 1210. The pressure cell 1224 is fluidly coupled to a plenum 1232 (e.g., air channel) that extends between the pressure cell 1224 and a location proximate the microphone of the electronic device to which the apparatus 1202 is detachably affixed. A distal section of the plenum 1232 includes an outlet port 1234 which, when the apparatus 1202 is properly positioned on the electronic device, is located adjacent an inlet port of the microphone of the electronic device. In some embodiments, a seal member is disposed at the outlet port 1234, which provides a fluidic seal between the plenum 1232 and the inlet port of the microphone. The seal member may be formed from a compliant (e.g., lower durometer) material, such as silicone rubber, closed-cell foam, or other type of gasket.

Figure 13:
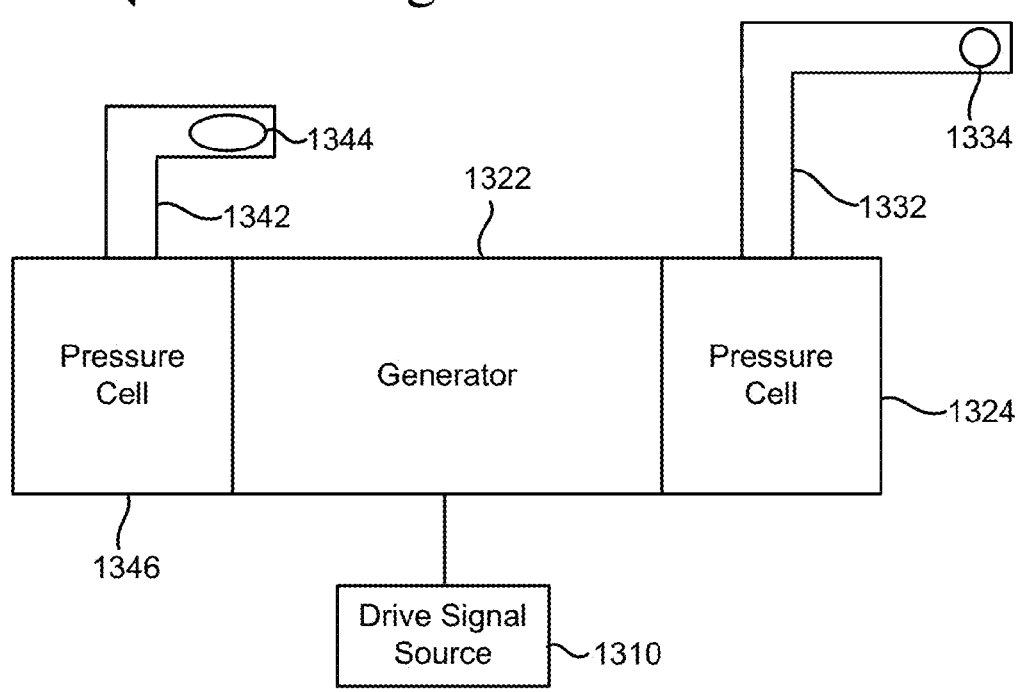
FIG. 13 is an illustration of a microphone and camera disruption apparatus that employs air pressure for use with an electronic device having a multiplicity of microphones and cameras in accordance with various embodiments.

FIG. 13 illustrates various components of a microphone and camera disruption apparatus 1302 in accordance with other embodiments. The microphone and camera disruption apparatus 1302 shown in FIG. 13 is configured to disrupt a multiplicity of microphones of an electronic device to which the apparatus 1302 is detachably affixed. In the embodiment shown in FIG. 13, the apparatus 1302 includes a generator 1322 configured to disrupt two microphones of an electronic device, it being understood that more than two microphones can be disrupted using a single generator. The apparatus 1302 includes a generator 1322 coupled to a first pressure cell 1324 and a second pressure cell 1346. The generator 1322 receives a drive signal from a drive signal source 1310. The first pressure cell 1324 is fluidly coupled to a first plenum 1332 (e.g., air channel) that extends between the first pressure cell 1324 and a location proximate a first microphone of the electronic device to which the apparatus 1302 is detachably affixed. A distal portion of the first plenum 1332 includes a first outlet port 1334 which, when the apparatus 1302 is properly positioned on the electronic device, is located adjacent an inlet port of the first microphone. The second pressure cell 1346 is fluidly coupled to a second plenum 1342 (e.g., air channel) that extends between the second pressure cell 1346 and a location proximate a second microphone of the electronic device to which the apparatus 1302 is detachably affixed. A distal portion of the second plenum 1342 includes a second outlet port 1344 which, when the apparatus 1302 is properly positioned on the electronic device, is located adjacent an inlet port of the second microphone. In some embodiments, a seal member (not shown) is disposed at one or both of the outlet ports 1334 and 1344.

In some implementations, the first and second microphones of the electronic device are disposed on different surfaces of the electronic device's housing, while in other implementations the first and second microphones are disposed on a common surface of the housing. It can be appreciated that, depending on the locations of the microphones, the plenums 1332 and 1342 can be configured to provide an relatively airtight conduit between the first and second pressure cells 1324, 1346 and the microphone locations, respectively. The plenums 1332 and 1342 can, therefore, be implemented to have a relatively complex three-dimensional shape, examples of which will be described hereinbelow. As with other components of the microphone and camera disruption apparatus 1302, the plenums 1332 and 1342 are affixed to the support structure of the apparatus 1302, which may be a cover or partial cover that can be detachably affixed to the electronic device according to various embodiments.

Figure 14:
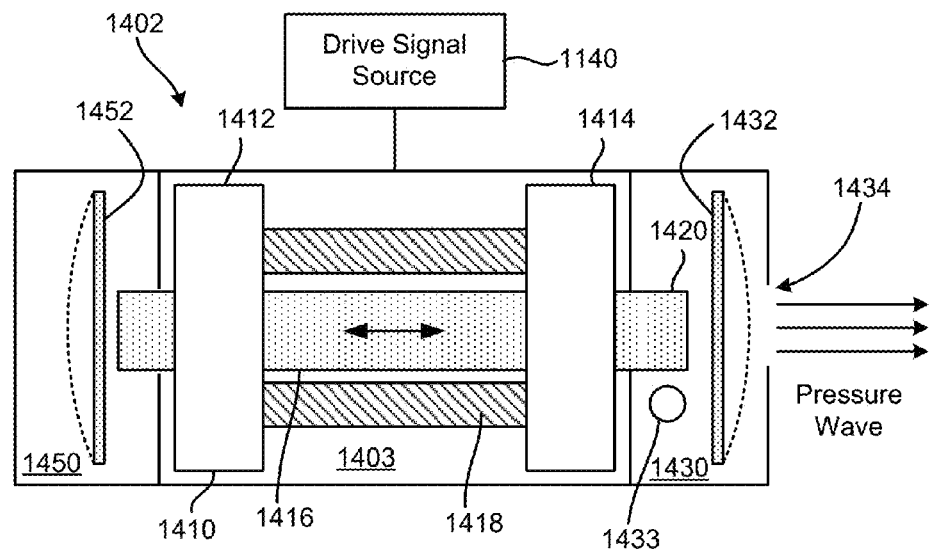
FIG. 14 illustrates a microphone and camera disruption apparatus that employs air pressure for use with an electronic device having a microphone and a camera in accordance with various embodiments.

FIG. 14 illustrates various details of a microphone and camera disruption apparatus 1402 in accordance with various embodiments. The apparatus 1402 shown in FIG. 14 is configured to disrupt a microphone of an electronic device using air pressure. According to some embodiments, the apparatus 1402 includes a motor or generator in the form of a voice coil constructed by winding fine magnet wire around a spool with a hollow core. Inside the core is a strong permanent magnet, and a second non-magnetic part having the same geometry as the magnet. This half-magnetic, half non-magnetic piston arrangement produces good efficiency in converting electrical energy into mechanical oscillating motion.

The apparatus 1402 shown in FIG. 14 includes a generator 1403 coupled to a pressure cell 1430 and a rebound cell 1450. The generator 1403 includes a spool 1410 comprising a first flange 1412, a second flange 1414, and a bobbin 1416 extending between the first and second flanges 1412 and 1414. An electromagnet coil 1418 is wound about the bobbin 1416. The electromagnet coil 1418 is coupled to a drive signal source 1440. The bobbin 1416 comprises a central bore dimensioned to receive a piston 1420. The piston 1420 includes at least some magnetic material which interacts with the electromagnetic field produced by the electromagnet coil 1418 in response to drive signals received from the drive signals source 1440. The piston 1420, in response to the drive signals, translates axially in an oscillatory manner and at a relatively high rate within the central bore of the bobbin 1416. During its axial excursions within the bobbin's central bore, the piston 1420 extends beyond the first and second flanges 1412 and 1414 of the spool 1410 during each excursion cycle.

The pressure cell 1430 includes an outlet 1434 and an inlet dimensioned to receive a first end of the piston 1420. The pressure cell 1430 supports a compliant membrane 1432 which is subject to displacement in response to forcible contact with the piston 1420. Repeated forced displacement of the complaint membrane 1432 by the piston 1420 causes displacement of air within the pressure cell 1430 and production of a pressure wave. The pressure wave produced by the generator 1403 is directed out of the pressure cell 1430 via outlet port 1434. The outlet port 1434 of the pressure cell 1430 is fluidly coupled to a plenum or air channel that extends between the microphone and camera disruption apparatus 1402 and a microphone of an electronic device to which the apparatus 1402 is detachably affixed. In some implementations, the outlet port 1434 is located on a surface of the pressure cell 1430 that is off-axis (e.g., by about 45° to about 135°) relative to the axis of the piston 1420. For example, the outlet port 1434 can be oriented about 90° from the axis of the piston 1420 (see, e.g., FIGS. 6 and 7). The off-axis orientation of the outlet port 1434 relative to the piston 1420 allows for a more compact plenum layout design in certain configurations. The pressure cell 1430 also includes a porthole 1433 which allows for voice sounds to travel to the native microphone of the electronic device when the generator 1403 is inactive. The porthole 1433 is covered when the generator 1403 is active, such as by a flap that can be moved in and out of covered engagement with the porthole 1433. Such a movable flap can be actuated by, or integral to, a switch that is actuated by the user when activating and deactivating the apparatus 1402.

The generator 1403 may include a rebound cell 1450 which includes an inlet dimensioned to receive a second end of the piston 1420 and a compliant membrane 1452 situated proximate this inlet. According to some embodiments, the compliant members 1432 and 1452 can be implemented as ⅟₃₂" thick, 10 A durometer silicone rubber membranes. In some embodiments, the rebound cell 1450 may include a spring instead of, or in addition to, the compliant membrane 1452. Forcible contact between the second end of the piston 1420 and the compliant membrane 1452 results in a rebound force that serves to redirect the piston 1420 towards the pressure cell 1430. It is noted that in some embodiments, a rebound cell 1430 is not needed, and that the electromagnetic interaction between the electromagnet coil 1418 and the magnetic material of the piston 1420 is sufficient to redirect the piston 1420 towards the pressure cell 1430 to achieve a desired cycling rate.

The drive signal produced by the drive signals source 1440 can be selected to achieve a desired level of microphone disruption. In addition to disrupting microphone function, the drive signal can be selected to provide for a low level of noise produced by the generator 1403 during operation, so as to avoid disturbing the user of the electronic device. In some embodiments, the drive signals source 1440 can produce a low frequency sine wave (e.g., from about 50-150 Hz, such as about 100 Hz). A low frequency sine wave has been shown to create very little mechanical noise that can be perceived by the user, while still causing microphone clipping to occur sufficiently fast so as to obscure audio frequency information. The drive signal source 1440 can generate other waveforms, such as white, brown or pink noise, low-pass filtered noise, or more complex audio signals, such as music or speech that can also be used to clip the microphone and mask private information. In some embodiments, the drive signal source 1440 can be configured to produce a signal containing significant high harmonics that can generate mechanical vibrations that couple into the housing of the electronic device, and ultimately produce undesirable audible noise at the microphone. In other embodiments, the apparatus 1402 can include an auxiliary microphone (see, e.g., FIGS. 16 and 17) that receives a user's voice sounds. A processor, coupled to the auxiliary microphone, can be configured to invert the audio signal generated from the received user's voice sounds. The drive signal source 1440 can drive the generator 1403 using at least the inverted audio signal as a drive signal. This approach can provide for both microphone clipping and cancelation of any user voice sounds picked up by the native microphone of the electronic device.

Figure 15:
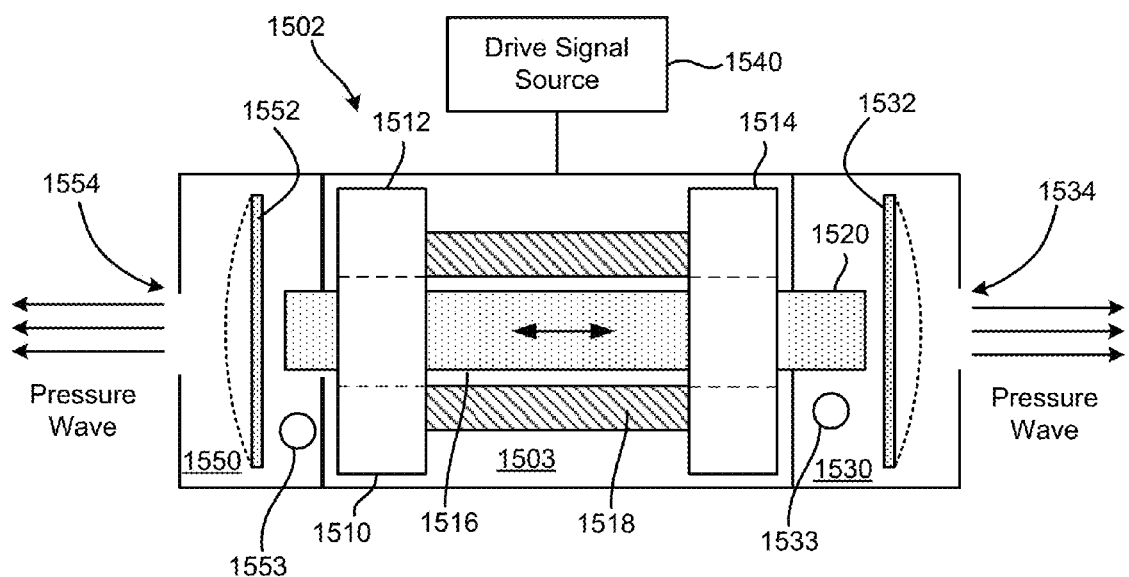
FIG. 15 illustrates a microphone and camera disruption apparatus that employs air pressure for use with an electronic device having a multiplicity of microphones and cameras in accordance with various embodiments.

FIG. 15 illustrates various details of a microphone and camera disruption apparatus 1502 in accordance with various embodiments. The apparatus 1502 shown in FIG. 15 is configured to disrupt two microphones of an electronic device using air pressure produced by a single generator 1503. The generator 1503 is coupled to a first pressure cell 830 and a second pressure cell 1550. The generator 1503 includes a spool 1510 comprising a first flange 1512, a second flange 1514, and a bobbin 1516 having an axial bore extending between the first and second flanges 1512 and 1514. An electromagnet coil 1518 is wound about the bobbin 1516, and is coupled to a drive signal source 1540. A piston 1520, which includes at least some magnetic material, interacts with the electromagnetic field produced by the electromagnet coil 1518 in response to drive signals received from the drive signals source 1540. The piston 1520, in response to the drive signals, translates axially in an oscillatory manner and at a relatively high rate within the central bore of the bobbin 1516, extending beyond the first and second flanges 1512 and 1514 of the spool 1510 during each excursion cycle.

The first pressure cell 1530 includes an outlet 1534 and an inlet dimensioned to receive a first end of the piston 1520. The first pressure cell 1530 supports a compliant membrane 1532 which is subject to displacement in response to forcible contact with the first end of the piston 1520. Repeated forced displacement of the complaint membrane 1532 by the piston 1520 causes displacement of air within the first pressure cell 1530 and production of a pressure wave, which is communicated out of an outlet port 1534 of the first pressure cell 1530. The outlet port 1534 is fluidly coupled to a plenum or air channel that extends between the microphone and camera disruption apparatus 1502 and a first microphone of an electronic device to which the apparatus 1502 is detachably affixed.

The second pressure cell 1550 includes an outlet 1554 and an inlet dimensioned to receive a second end of the piston 1520. The second pressure cell 1550 supports a compliant membrane 1552 which is subject to displacement in response to forcible contact with the second end of the piston 1520. Repeated forced displacement of the complaint membrane 1552 by the piston 1520 causes displacement of air within the second pressure cell 1530 and production of a pressure wave, which is communicated out of an outlet port 1554 of the second pressure cell 1550. The outlet port 1554 is fluidly coupled to a second plenum or air channel that extends between the microphone and camera disruption apparatus 1502 and a second microphone of an electronic device to which the apparatus 1502 is detachably affixed. In some implementations, one or both of the outlet ports 1534 and 1554 can be located on a surface of their respective pressure cell 1530 and 1550 that is off-axis (e.g., by about 45° to about 135°, such as 150°) relative to the axis of the piston 1520. The pressure cells 1530 and 1550 each include a porthole 1533 and 1553 which allows for voice sounds to travel to respective native microphones of the electronic device when the generator 1503 is inactive. As discussed previously, the portholes 1533 and 1553 are covered during operation of the generator 1503.

According to some embodiments, the housing of the generator and the pressure/rebound cells can be fashioned out of mu-metal for magnetic shielding of the motor magnet. In some embodiments, the spool of the generator can be made of Delrin plastic, which has good inherent lubricity and other physical properties.

FIGS. 16-18 illustrate various configurations of a piston that can be used in a generator of a microphone and camera disruption apparatus in accordance with various embodiments. The piston 1620 shown in FIG. 16 includes a first section 1622 and a second section 1624. The second section 1624 includes permanent magnetic material, such as Neodymium/Iron/Boron (NdFeB) or Samarium/Cobalt, however use of stronger magnets, such as NdFeB tends to provide a more efficient motor. The first section 1622 comprises nonmagnetic material, such as plastic or rubber. When installed within the central bore of the bobbin of a generator, such as those shown in FIGS. 14 and 15, the piston 1620 is positioned within the central bore such that the second section 1624 containing permanent magnetic material is near the center of the electromagnet coil and the first section 1622 is near the flange adjacent the compliant membrane of the pressure cell.

FIG. 17 shows a double-ended piston 1720 which includes a first section 1722, a second section 1724, and a third section 1726. Each of the first and third sections 1722 and 1726 comprise permanent magnetic material, while the intervening second section 1724 comprises a non-magnetic material, such as plastic or rubber. Provision of magnetic material at opposing and sections of the piston 1720 shown in FIG. 17 provides for enhanced electromagnetic interaction between the piston 1720 and the electromagnet coil of the generator. For example, the displacement rate of, and impact force created by, the double-ended piston 1720 can be increased relative to a single-ended piston, such as that shown in FIG. 16.

FIGS. 18A-18C show different configurations of a two-piece piston of a pressure generator in accordance with various embodiments. FIG. 18A illustrates a piston 1820A comprising a first magnetic section 1822 and a second magnetic section 1824. In the configuration shown in FIG. 18A, the two magnetic sections 1822 and 1824 are separated by space (e.g., a void or an air gap), such that no intervening structure connects the two magnetic sections 1822 and 1824. The two magnetic sections 1822 and 1824 are positioned with like poles oriented towards each other, in a magnetically repelling relationship. The relative position and movement of the two magnetic sections 1822 and 1824 is moderated by the electromagnetic field created by the electromagnet coil of the generator.

In the embodiment shown in FIG. 18B, a piston 1820B comprises a first magnetic section 1822, a second magnetic section 1824, and a binding material or layer 1836 that mechanically connects the first and second magnetic sections 1822, 1824. The binding material or layer 1836 may be an adhesive, glue, or other binding material. The two magnetic sections 1822 and 1824 are positioned with like poles oriented towards each other, in a magnetically repelling relationship. In the embodiments illustrated in FIG. 18C, a piston 1820C comprises a first magnetic section 1822 and a second magnetic section 1824 disposed in a thin-walled sleeve or sheath 1832. End caps 1834 can be included to enclose the first and second magnetic sections 1822, 1824 within the sheath 1832. The two magnetic sections 1822 and 1824 are positioned with like poles oriented towards each other, in a magnetically repelling relationship. In some configurations, a binding material or layer can be used to mechanically connect the first and second magnetic sections 1822, 1824 (see, e.g., material 1836 of FIG. 18B).

Figure 19:
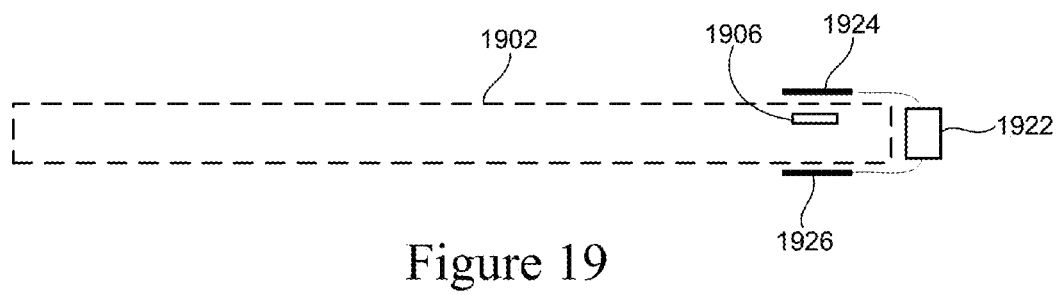
FIG. 19 illustrates a microphone and camera disruption apparatus configured to produce an electric force that renders a microphone nonresponsive to audio sounds in accordance with various embodiments.

FIG. 19 illustrates a microphone and camera disruption apparatus configured to produce an electric force that renders a microphone nonresponsive to audio sounds in accordance with various embodiments. The apparatus shown in FIG. 19 includes a generator 1922 electrically coupled to a pair of conducting plates 1924 and 1926 positioned relative to a microphone 1906 of an electronic device 1902. As illustrated, the conducting plates 1924 and 1926 are positioned so that the microphone 1906 is located between the conducting plates 1924 and 1926. The generator 1922 provides a voltage drive signal to the conducting plates 1924 and 1926. In response to the voltage drive signal, an alternating electric charge is developed on the conducting plates, causing an electric force to interfere with the charged diaphragm in the microphone (e.g., in an electret condenser microphone).

Figure 20:
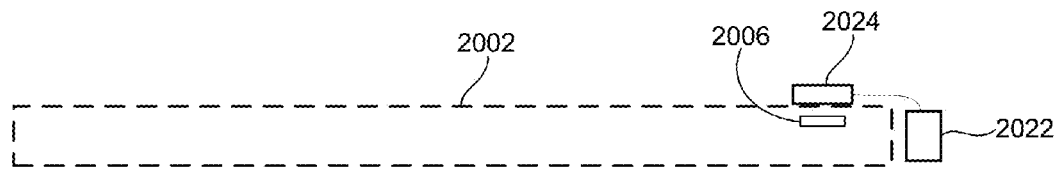
FIG. 20 illustrates a microphone and camera disruption apparatus configured to produce a mechanical force that renders a microphone nonresponsive to audio sounds in accordance with various embodiments.

FIG. 20 illustrates a microphone and camera disruption apparatus configured to produce a mechanical force that renders a microphone nonresponsive to audio sounds in accordance with various embodiments. The apparatus shown in FIG. 20 includes a generator 2022 electrically coupled to a vibrator 2024 positioned relative to a microphone 2006 of an electronic device 2002. The generator 2022 provides a voltage drive signal to the vibrator 2024, causing the vibrator 2024 to deliver a complex mechanical vibration to the housing of the electronic device 2002, that couples through to the microphone 2006.

Figure 21:
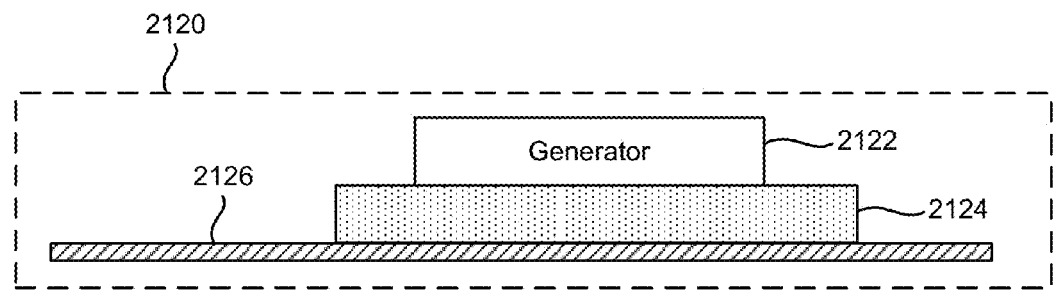
FIG. 21 is a cross-sectional illustration showing a vibration isolation arrangement for a microphone and camera disruption apparatus in accordance with various embodiments.

FIG. 21 is a cross-sectional illustration showing a vibration isolation arrangement for a microphone and camera disruption apparatus 2120 in accordance with various embodiments. In the representative example shown in FIG. 21, a generator 2122 is supported by a substrate 2126 and a vibration absorption element 2124 is disposed between the generator 2122 and the substrate 2126. The vibration absorption element 2124 is formed from a material that can dampen mechanical vibrations produced by the generator 2122, such as silicone rubber.

Figure 22:
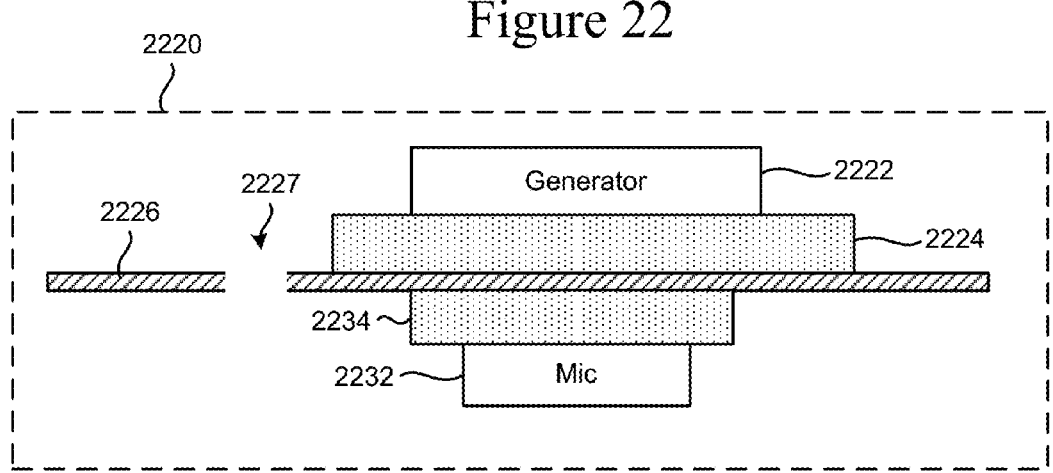
FIG. 22 is a cross-sectional illustration showing a vibration isolation arrangement for a microphone and camera disruption apparatus in accordance with various embodiments.

FIG. 22 is a cross-sectional illustration showing a vibration isolation arrangement for a microphone and camera disruption apparatus 2220 in accordance with various embodiments. In the representative example shown in FIG. 22, a generator 2222 is supported by a substrate 2226 and a vibration absorption element 2224 is disposed between the generator 2222 and the substrate 2226. According to some embodiments, the microphone and camera disruption apparatus 2220 can incorporate an auxiliary microphone 2232 which can be used to facilitate secured conversations when the microphone(s) of the electronic device is/are being disrupted by the microphone and camera disruption apparatus 2220. In such embodiments, the auxiliary microphone 2232 can be communicatively coupled to an auxiliary processor (also supported by the cover, sleeve or band) configured to encrypt the audio signals received from the auxiliary microphone 2232. The encrypted audio signals can then be transmitted from the auxiliary processor to the electronic device's communication circuitry for transmission through the device's normal communication link (and then decrypted on the receiving end). In addition to use of vibration absorption element 2224 for the generator 2222, an additional vibration absorption element 2234 can be used to dampen vibration between the auxiliary microphone 2232 and the substrate 2226 and/or generator 2222.

As illustrated, the auxiliary microphone 2232 is mounted on a lower surface of the substrate 2226, while the generator 2222 is mounted on an upper surface of the substrate 2226. In such implementations, a whole or void 2227 is provided in the substrate 2226 to allow sound to impinge the auxiliary microphone 2232. It is understood that in some embodiments, the auxiliary microphone 2232 and vibration absorption element 2234 can be mounted on the same surface as that supporting the generator 2222.

Figure 23:
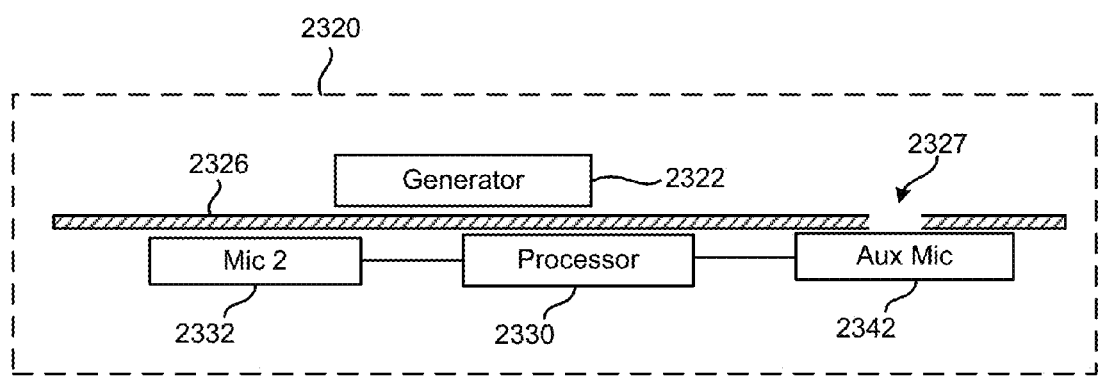
FIG. 23 is a cross-sectional illustration showing a noise cancellation arrangement for a microphone and camera disruption apparatus in accordance with various embodiments.

FIG. 23 is a cross-sectional illustration showing a noise cancellation arrangement for a microphone and camera disruption apparatus 2320 in accordance with various embodiments. In this illustrative example, an auxiliary microphone 2342 is used to facilitate secured conversations when the microphone or microphones of the electronic device are being disrupted by the microphone and camera disruption apparatus 2320. The noise cancellation arrangement shown in FIG. 23 includes a generator 2370 situated on a first surface of a substrate 2326. A second microphone 2332 and the auxiliary microphone 2342 are mounted on an opposing surface of the substrate 2326. A processor 2330 is coupled to the two microphones 2332 in 2342. A void or hole 2327 is provided in the substrate 2326 to allow externally produced sound (e.g., voice sounds from a user) to reach the auxiliary microphone 2342.

The second microphone 2332 is configured to pick up noise created by the generator 2322 during operation. The second microphone 2332 is isolated from receiving externally produced sound (e.g., voice sounds from a user). In some implementations, the auxiliary microphone 2342 is mounted on vibration absorption material (not shown). Enhanced noise reduction can be achieved by canceling generator noise that may be detected by the auxiliary microphone 2342 using an audio signal produced by the second microphone 2332. For example, an audio signal produced by the second microphone 2332 (and containing generator noise) can be inverted by the processor 2330 and summed with an audio signal produced by the auxiliary microphone 2342 to cancel the generator noise using known techniques.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An apparatus for use with an electronic device having a microphone and at least one camera, the apparatus comprising:
    a structure configured to detachably couple to the device;
    a shutter supported by the structure and operable between an activated state and a deactivated state, the shutter comprising a lens shutter configured to obscure a lens of the camera when in the activated state;
    a channel configured to fluidically couple to the microphone; and
    a generator supported by the structure and fluidically coupled to the channel, the generator configured to deliver a modulated flow of air to the channel that acts on a diaphragm of the microphone and renders the microphone unresponsive to voice sounds.

2. The apparatus of claim 1, wherein the lens shutter comprises an opaque coating or material.

3. The apparatus of claim 1, wherein the lens shutter comprises an electro-optical element.

4. The apparatus of claim 1, wherein the shutter supports the channel.

5. The apparatus of claim 1, wherein the shutter supports the generator.

6. The apparatus of claim 1, wherein the shutter supports the channel and the generator.

7. The apparatus of claim 1, wherein:
    the shutter is connected to a switch configured to be manually actuated in a non-engaged position and an engaged position;
    with the switch in the engaged position, the channel is fluidically coupled to the microphone and the lens shutter is in the activated state; and
    with the switch in the non-engaged position, the channel is fluidically decoupled from the microphone and the lens shutter is in the deactivated state.

8. The apparatus of claim 7, wherein:
    the switch is configured to concurrently activate the lens shutter and the generator when in the engaged position; and
    the switch is configured to concurrently deactivate the lens shutter and the generator when in the disengaged position.

9. The apparatus claim 1, comprising a power source supported by the structure and coupled to at least the generator.

10. The apparatus of claim 1, wherein the shutter comprises:
    a first plenum having a first channel configured to fluidically couple to a first microphone of the device, the first plenum comprising a first lens shutter configured to align with a first camera of the device in the activated state; and
    a second plenum having a second channel configured to fluidically couple to a second microphone of the device, the second plenum comprising a second lens shutter configured to align with a second camera of the device in the activated state;
    wherein the first and second channels are fluidically coupled to the generator.

11. The apparatus of claim 1, wherein the shutter comprises:
    a first plenum having a first channel configured to fluidically couple to a first microphone of the device, the first plenum comprising a first lens shutter configured to align with a first camera of the device in the activated state;
    a first generator fluidically coupled to the first channel;
    a second plenum having a second channel configured to fluidically couple to a second microphone of the device, the second plenum comprising a second lens shutter configured to align with a second camera of the device in the activated state; and
    a second generator fluidically coupled to the second channel.

12. The apparatus of claim 1, wherein the structure comprises a cover or a sleeve configured to detachably couple to the device.

13. An apparatus for use with an electronic device having a microphone and at least one camera, the apparatus comprising:
    a structure configured to detachably couple to the device;
    a shutter supported by the structure and operable between an activated state and a deactivated state, the shutter comprising a lens shutter configured to obscure a lens of the camera when in the activated state;
    a channel configured to fluidically couple to the microphone; and
    a generator supported by the structure and fluidically coupled to the channel, the generator comprising:
        an electromagnet coil; and
        a piston comprising a permanent magnet and configured to translate axially in an oscillatory manner in response to an electromagnetic field produced by the electromagnetic coil;
    wherein oscillatory movement of the piston produces a modulated flow of air delivered to the channel that acts on a diaphragm of the microphone and renders the microphone unresponsive to voice sounds.

14. The apparatus of claim 13, wherein the lens shutter comprises an opaque coating or material.

15. The apparatus of claim 13, wherein the lens shutter comprises an electro-optical element.

16. The apparatus of claim 13, wherein the shutter supports the channel.

17. The apparatus of claim 13, wherein the shutter supports the generator.

18. The apparatus of claim 13, wherein the shutter supports the channel and the generator.

19. A method involving a microphone and a camera of an electronic device, the method comprising:
- generating, at a cover or a sleeve detachably coupled to an external surface of the device, a modulated flow of air that is directed at the microphone;
- rendering the microphone unresponsive to voice sounds by the modulated flow of air acting on the microphone; and
- obscuring a lens of the camera while rendering the microphone unresponsive to voice sounds.

20. The method of claim 19, wherein generating, rendering, and obscuring are implemented at a shutter of the cover or sleeve.

21. The method of claim 19, further comprising moving a switch coupled to a shutter of the cover or sleeve between a non-engaged position and an engaged position;
- wherein generating, rendering, and obscuring are implemented at the shutter when in the engaged position.

* * * * *